(12) United States Patent
Figueira

(10) Patent No.: US 8,730,812 B2
(45) Date of Patent: *May 20, 2014

(54) HIERARCHICAL RATE COLOR MARKER

(75) Inventor: Norival R. Figueira, Campbell, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 444 days.

This patent is subject to a terminal disclaimer.

(21) Appl. No.: 13/005,485

(22) Filed: Jan. 12, 2011

(65) Prior Publication Data

US 2011/0158101 A1    Jun. 30, 2011

Related U.S. Application Data

(63) Continuation-in-part of application No. 12/643,902, filed on Dec. 21, 2009, now Pat. No. 8,467,296.

(60) Provisional application No. 61/295,143, filed on Jan. 14, 2010, provisional application No. 61/353,911, filed on Jun. 11, 2010, provisional application No. 61/143,585, filed on Jan. 9, 2009, provisional application No. 61/146,477, filed on Jan. 22, 2009, provisional application No. 61/225,483, filed on Jul. 14, 2009, provisional application No. 61/251,139, filed on Oct. 13, 2009, provisional application No. 61/253,791, filed on Oct. 21, 2009.

(51) Int. Cl.
*H04L 12/26* (2006.01)

(52) U.S. Cl.
USPC ........ 370/235.1; 370/231; 370/230; 370/412; 709/225; 709/235

(58) Field of Classification Search
USPC ............ 370/229–235, 395.4, 395.21, 395.42, 370/395.43, 390; 709/225, 235
See application file for complete search history.

(56) References Cited

U.S. PATENT DOCUMENTS

| | | | |
|---|---|---|---|
| 6,192,032 B1 * | 2/2001 | Izquierdo | 370/230 |
| 6,424,624 B1 * | 7/2002 | Galand et al. | 370/231 |
| 6,748,435 B1 * | 6/2004 | Wang et al. | 370/230 |
| 6,910,148 B1 | 6/2005 | Ho | |
| 6,938,179 B2 | 8/2005 | Iyer | |

(Continued)

FOREIGN PATENT DOCUMENTS

WO    2005006678 A1    1/2005

OTHER PUBLICATIONS

Tal Anker; Hierarchical Bandwidth Sharing mad Simple, Feb. 13, 2002.*

(Continued)

*Primary Examiner* — Charles C. Jiang
*Assistant Examiner* — Mohamed Kamara
(74) *Attorney, Agent, or Firm* — Shun Yao; Park, Vaughan, Fleming & Dowler LLP

(57) ABSTRACT

One embodiment provides a system that facilitates bandwidth-profile enforcement. During operation, the system indicates a packet's compliance with a bandwidth profile based at least on available high-compliance tokens and medium-compliance tokens. The system further converts, within different classes of service (CoSs), an overflow high-compliance token to a medium-compliance token, in a top-down or bottom-up fashion with respect to different CoS priorities.

24 Claims, 23 Drawing Sheets

(56) References Cited

U.S. PATENT DOCUMENTS

| | | | |
|---|---|---|---|
| 6,970,426 B1* | 11/2005 | Haddock | 370/235.1 |
| 7,093,160 B2 | 8/2006 | Lau | |
| 2006/0176818 A1 | 8/2006 | Olsen | |
| 2007/0153682 A1* | 7/2007 | Swenson et al. | 370/229 |
| 2008/0219160 A1* | 9/2008 | Trinh et al. | 370/230 |
| 2009/0207857 A1* | 8/2009 | Alexander, Jr. | 370/474 |

OTHER PUBLICATIONS

Haddock, Stephen, "Extreme comments on ESA-2/d4 straw ballot", Extreme Networks, Jan. 2006, pp. 1-10.

MEF Technical Specification: MEF 10.1, Ethernet Services Attributes Phase 2, Nov. 2006.

MEF Technical Specification: MEF 10.2, Ethernet Services Attributes Phase 2, Oct. 27, 2009.

* cited by examiner

COMMITTED TOKEN EQUATIONS $$802 \rightarrow D_c^i(t_j) = CBS^i - \hat{B}_c^i(t_j) \quad i=1 \text{ to } n$$

$$804 \rightarrow X(t_j) = \sum_{k=1}^{n}(SF^k \times O_c^k(t_j))$$

$$806 \rightarrow f_c^i(t_j) = \min\left\{\frac{CIR_{\max}^i - CIR^i}{8} \times (t_j - t_{j-1}), SF^i \times D_c^i(t_j), X(t_j) - \left[\sum_{k=0}^{i-1} f_c^k(t_j)\right]\right\} \quad f_c^0(t_j) = 0$$
$$i=1 \text{ to } n$$

$$808 \rightarrow O_c(t_j) = X(t_j) - \sum_{k=1}^{n} f_c^k(t_j)$$

EXCESS TOKEN EQUATIONS $$810 \rightarrow O_e^i(t_j) = \max\left\{0, B_e^i(t_{j-1}) + \frac{EIR^i}{8} \times (t_j - t_{j-1}) - EBS^i\right\}$$
$$i=1 \text{ to } n$$

$$812 \rightarrow D_e^i(t_j) = EBS^i - \hat{B}_e^i(t_j)$$
$$i=1 \text{ to } n$$

$$814 \rightarrow Y(t_j) = \sum_{k=1}^{n}(SF^k \times O_e^k(t_j)) + CF \times O_c(t_j)$$

$$816 \rightarrow f_e^i(t_j) = \min\left\{\frac{EIR_{\max}^i - EIR^i}{8} \times (t_j - t_{j-1}), SF^i \times D_e^i(t_j), Y(t_j) - \left[\sum_{k=0}^{i-1} f_e^k(t_j)\right]\right\} \quad f_e^0(t_j) = 0$$
$$i=1 \text{ to } n$$

NON-DIRECTIONAL CIR, EIR SHARING, NON-DIRECTIONAL COUPLING

FIG. 8

COMMITTED TOKEN EQUATIONS $902 \quad D_c^i(t_j) = CBS^i - \hat{B}_c^i(t_j)$
$\quad\quad i=1 \text{ to } n$ $904 \quad X^i(t_j) = \sum_{k=0}^{i}(SF^k \times O_c^k(t_j)) \quad O_c^0(t_j) = 0$ $906 \quad f_c^i(t_j) = \min\left\{\dfrac{CIR_{\max}^i - CIR^i}{8} \times (t_j - t_{j-1}), SF^i \times D_c^i(t_j), X^{i-1}(t_j) - \left[\sum_{k=0}^{i-1} f_c^k(t_j)\right]\right\} \quad f_c^0(t_j) = 0$
$\quad\quad i=1 \text{ to } n$ $908 \quad O_c(t_j) = X(t_j) - \sum_{k=1}^{n} f_c^k(t_j)$

EXCESS TOKEN EQUATIONS $910 \quad O_e^i(t_j) = \max\left\{0, B_e^i(t_{j-1}) + \dfrac{EIR^i}{8} \times (t_j - t_{j-1}) - EBS^i\right\}$
$\quad\quad i=1 \text{ to } n$ $912 \quad D_e^i(t_j) = EBS^i - \hat{B}_e^i(t_j)$ $914 \quad Y^i(t_j) = \sum_{k=0}^{i}(SF^k \times O_e^k(t_j)) + CF \times O_c(t_j) \quad O_e^0(t_j) = 0$ $916 \quad f_e^i(t_j) = \min\left\{\dfrac{EIR_{\max}^i - EIR^i}{8} \times (t_j - t_{j-1}), SF^i \times D_e^i(t_j), Y^{i-1}(t_j) - \left[\sum_{k=0}^{i-1} f_e^k(t_j)\right]\right\} \quad f_e^0(t_j) = 0$
$\quad\quad i=1 \text{ to } n$

DIRECTIONAL CIR, EIR SHARING, NON-DIRECTIONAL COUPLING

FIG. 9

COMMITTED TOKEN EQUATIONS

$$1002: D_c^i(t_j) = CBS^i - \hat{B}_c^i(t_j) \quad i=1 \text{ to } n$$

$$1004: X^i(t_j) = \sum_{k=0}^{i}(SF^k \times O_c^k(t_j)) \quad O_c^0(t_j) = 0$$

$$1006: f_c^i(t_j) = \min\left\{\frac{CIR_{max}^i - CIR^i}{8} \times (t_j - t_{j-1}), SF^i \times D_c^i(t_j), X^{i-1}(t_j) - \left[\sum_{k=0}^{i-1} f_c^k(t_j)\right]\right\} \quad f_c^0(t_j) = 0 \quad i=1 \text{ to } n$$

$$1008: Z_c^i(t_j) = \max\{0, X^i(t_j) - \sum_{k=1}^{n} f_c^k(t_j)\}$$

EXCESS TOKEN EQUATIONS

$$1010: O_e^i(t_j) = \max\left\{0, B_e^i(t_{j-1}) + \frac{EIR^i}{8} \times (t_j - t_{j-1}) - EBS^i\right\} \quad i=1 \text{ to } n$$

$$1012: D_e^i(t_j) = EBS^i - \hat{B}_e^i(t_j) \quad i=1 \text{ to } n$$

$$1014: Y^i(t_j) = \sum_{k=0}^{i}[SF^k \times O_e^k(t_j)] + CF \times Z_c^{i-1}(t_j) \quad O_e^0(t_j) = 0$$

$$1016: f_e^i(t_j) = \min\left\{\frac{EIR_{max}^i - EIR^i}{8} \times (t_j - t_{j-1}), SF^i \times D_e^i(t_j), Y^{i-1}(t_j) - \left[\sum_{k=0}^{i-1} f_e^k(t_j)\right]\right\} \quad f_e^0(t_j) = 0 \quad i=1 \text{ to } n$$

DIRECTIONAL CIR, EIR SHARING, DIRECTIONAL COUPLING (TOP-DOWN)

FIG. 10A

COMMITTED TOKEN EQUATIONS

$$D_c^i(t_j) = CBS^i - \hat{B}_c^i(t_j)$$
$$i = 1 \text{ to } n$$

$$X^i(t_j) = \sum_{k=0}^{i} (SF^k \times O_c^k(t_j)) \quad O_c^0(t_j) = 0$$

$$f_c^i(t_j) = \min\left\{\frac{CIR_{max}^i - CIR^i}{8} \times (t_j - t_{j-1}), SF^i \times D_c^i(t_j), X^{i-1}(t_j) - \left[\sum_{k=0}^{i-1} f_c^k(t_j)\right]\right\} \quad f_c^0(t_j) = 0$$
$$i = 1 \text{ to } n$$

$$Z_c^i(t_j) = \min\{X^i(t_j), X^n(t_j) - \sum_{k=1}^{n} f_c^k(t_j)\}$$

EXCESS TOKEN EQUATIONS

$$O_e^i(t_j) = \max\left\{0, B_e^i(t_{j-1}) + \frac{EIR^i}{8} \times (t_j - t_{j-1}) - EBS^i\right\}$$
$$i = 1 \text{ to } n$$

$$D_e^i(t_j) = EBS^i - \hat{B}_e^i(t_j)$$

$$Y^i(t_j) = \sum_{k=0}^{i} [SF^k \times O_e^k(t_j)] + CF \times Z_c^{i+1}(t_j) \quad O_e^0(t_j) = 0$$

$$f_e^i(t_j) = \min\left\{\frac{EIR_{max}^i - EIR^i}{8} \times (t_j - t_{j-1}), SF^i \times D_e^i(t_j), Y^{i-1}(t_j) - \left[\sum_{k=0}^{i-1} f_e^k(t_j)\right]\right\} \quad f_e^0(t_j) = 0$$
$$i = 1 \text{ to } n$$

DIRECTIONAL CIR, EIR SHARING, DIRECTIONAL COUPLING (BOTTOM-UP)

FIG. 10B

COMMITTED TOKEN EQUATIONS

$D_c^i(t_j) = CBS^i - \hat{B}_c^i(t_j)$
$i=1 \text{ to } n$ $X^i(t_j) = \sum_{k=0}^{i}(SF^k \times O_c^k(t_j)) \quad O_c^0(t_j) = 0$ $f_c^i(t_j) = \min\left\{\dfrac{CIR_{\max}^i - CIR^i}{8} \times (t_j - t_{j-1}), SF^i \times D_c^i(t_j), X^{i-1}(t_j) - \left[\sum_{k=0}^{i-1} f_c^k(t_j)\right]\right\} \quad f_c^0(t_j) = 0$
$i=1 \text{ to } n$ $Z_c^i(t_j) = \max\{0, X^i(t_j) - \sum_{k=1}^{n} f_c^k(t_j)\}$

---

EXCESS TOKEN EQUATIONS

$O_e^i(t_j) = \max\left\{0, B_e^i(t_{j-1}) + \dfrac{EIR^i}{8} \times (t_j - t_{j-1}) - EBS^i\right\} \quad O_e^0(t_j) = 0$
$i=1 \text{ to } n$ $D_e^i(t_j) = EBS^i - \hat{B}_e^i(t_j)$ $Y^i(t_j) = \sum_{k=0}^{i}[SF^k \times O_e^k(t_j)] + CF^i \times Z_c^{i+1}(t_j)$ $f_e^i(t_j) = \min\left\{\dfrac{EIR_{\max}^i - EIR^i}{8} \times (t_j - t_{j-1}), SF^i \times D_e^i(t_j), Y^{i-1}(t_j) - \left[\sum_{k=0}^{i-1} f_e^k(t_j)\right]\right\} \quad f_e^0(t_j) = 0$
$i=1 \text{ to } n$

FIG. 10C

DIRECTIONAL CIR, EIR SHARING, DIRECTIONAL COUPLING (TOP-DOWN, COUPLING FOR EACH CoS CONTROLLED BY SEPARATE $CF^i$)

FIG. 11A

HIERARCHICAL RATE COLOR MARKER

RELATED APPLICATION

This application claims the benefit of:

U.S. Provisional Application No. 61/295,143, entitled "Hierarchical Bandwidth Profiler: Strict Priority Mode with Directional Coupling Using a Bottom-Up Option," by inventor Norival R. Figueira, filed on 14 Jan. 2010; and U.S. Provisional Application No. 61/353,911, entitled "Hierarchical Bandwidth Profile Algorithm: Strict Priority," by inventor Norival R. Figueira, filed on 11 Jun. 2010.

This application is a continuation-in-part application of U.S. application Ser. No. 12/643,902, entitled "Hierarchical Rate Color Marker," by inventor Norival R. Figueira, filed 21 Dec. 2009, which claims the benefit of:

U.S. Provisional Application No. 61/143,585, entitled "Hierarchical Rate Color Marker," by inventor Norival R. Figueira, filed on 9 Jan. 2009;

U.S. Provisional Application No. 61/146,477, entitled "Enhanced Hierarchical Rate Color Marker," by inventor Norival R. Figueira, filed on 22 Jan. 2009;

U.S. Provisional Application No. 61/225,483, entitled "Hierarchical Rate Color Marker Supporting Weighted Round Robin Distribution of Unused Bandwidth," by inventor Norival R. Figueira, filed on 14 Jul. 2009;

U.S. Provisional Application No. 61/251,139, entitled "Hierarchical bandwidth Profile Algorithm Implementation," by inventor Norival R. Figueira, filed on 13 Oct. 2009; and U.S. Provisional Application No. 61/253,791, entitled "Hierarchical Bandwidth Profile Algorithm Strict-priority Mode," by inventor Norival R. Figueira, filed on 21 Oct. 2009; all of which are incorporated herein by reference in their respective entireties.

BACKGROUND

1. Field

This disclosure is generally related to computer networking. More specifically, this disclosure is related to Quality of Service (QoS) provisioning in a network.

2. Related Art

A bandwidth profile is a set of traffic parameters applicable to a sequence of packets to provision QoS in a network. A rate color marker is often used with a bandwidth profile to determine the level of packet compliance with the specified bandwidth profile parameters. A rate color marker assigns different colored tokens to packets, and can thereby meter a sequence of packets, and mark or re-mark packets to indicate their level of compliance to a bandwidth profile. Such metering and marking can be used to enable services, such as provisioning QoS or congestion control, in communication networks. For example, the packet color marking may be used to indicate the level of assurance as to whether the packet is forwarded or discarded.

The Metro Ethernet Forum (MEF) specification MEF 10.1 is an industrial standard that defines a rate color marker method, or bandwidth profile method. The MEF 10.1 rate color marker marks, or re-marks, each packet or frame with the level of compliance with a bandwidth profile using one of three colors: green for high compliance, yellow for medium compliance, and red for low compliance.

The MEF 10.1 specification defines a bandwidth profile for a Virtual Circuit (VC) governed by six parameters <CIR, CBS, EIR, EBS, CF, CM>, where:

CIR is the Committed Information Rate expressed as bits per second.

CBS is the Committed Burst Size expressed as bytes (or data units).

EIR is the Excess Information Rate expressed as bits per second.

EBS is the Excess Burst Size expressed as bytes.

CF is the Coupling Flag with two possible values, 0 or 1.

CM is the Color Mode with two possible values, "color-blind" or "color-aware."

A rate color marker is in color-aware mode when each incoming packet already has a marking (i.e., a color) associated with it and that marking is taken into account in determining the new marking of the packet. Therefore, the rate color marker in color-aware mode may re-mark packets with a new color. By contrast, a rate color marker is in color-blind mode when the marking (if any) already associated with each packet is not taken into account in determining the new marking of the packet. The color mode of operation is determined using the parameter CM.

The operation of the existing rate color marker is as follows. The rate color marker uses a green token bucket and a yellow token bucket. At time $t_0$, the green token bucket has CBS tokens and the yellow token bucket has EBS tokens. During operation, the green token bucket is monotonically incremented at the CIR rate if the bucket has fewer than CBS tokens, i.e., it is not full. The yellow token bucket is monotonically incremented at the EIR rate if it has fewer than EBS tokens, i.e., it is not full. Additionally, if the green token bucket is full and CF=1, the yellow token bucket is incremented at the additional CIR rate if it has less than EBS tokens, i.e., if it is not full. The effect of incrementing the yellow token bucket at the additional CIR rate when the green token bucket is full can be equivalently described as monotonically incrementing the green token bucket at the CIR rate and sending overflow tokens that exceed the capacity of the green token bucket, i.e., CBS tokens, to the yellow token bucket, if it is not full.

The following refers to the operation of the rate color marker in color-blind mode, i.e., CM=color-blind. When receiving a packet of length $l_j$ bytes at time $t_j$, where $j \geq 1$ and $t_{j+1} \geq t_j$, if the green token bucket has at least $l_j$ tokens, the packet is marked, or re-marked, green and the number of tokens in the green token bucket is decremented by $l_j$ tokens. Else, if the yellow token bucket has at least $l_j$ tokens, the packet is marked, or re-marked, yellow and the yellow token bucket is decremented by $l_j$ tokens. Otherwise, the packet is marked red.

The following refers to the operation of the existing rate color marker in color-aware mode, i.e., CM=color-aware. When receiving a packet of $l_j$ bytes at time $t_j$, where $j \geq 1$ and $t_{j+1} \geq t_j$, if the packet is marked green and the green token bucket has at least $l_j$ tokens, the packet marking is maintained green and the number of tokens in the green token bucket is decremented by $l_j$ tokens. Else, if the packet is not marked red, i.e., the packet is marked green or yellow, and the yellow token bucket has at least $l_j$ tokens, the packet is re-marked yellow and the yellow token bucket is decremented by $l_j$ tokens. Otherwise, the packet is re-marked red.

The operation of the existing rate color marker can be more formally defined as follows. For a sequence of packets, $\{t_j, l_j\}$, $j \geq 1$, $t_{j+1} \geq t_j$, with arrival times at time $t_j$ and lengths $l_j$, the marking, or re-marking, of each packet is defined according to the procedure in Table 1. For this procedure, $B_c(t)$ and $B_e(t)$ are the number of tokens in the committed (green) and excess (yellow) token buckets, respectively, at a given time t, where $B_c(t_0)=CBS$ and $B_e(t_0)=EBS$, and $O(t_j)$ is the number of tokens that overflows the green token bucket in the interval of time $(t_{j-1}, t_j]$.

Two other rate color marker mechanisms are documented in Internet Engineering Task Force (IETF) Informational Request for Comments (RFC) 2697 and 2698. See Heinanen, J. and R. Guerin, "A Single Rate Three Color Marker," RFC 2697 (September, 1999), and Heinanen, J. and R. Guerin, "A Two Rate Three Color Marker," RFC 2698 (September, 1999).

Typically, a network device uses a rate color marker to determine the disposition of packets based on their markings In general, packets marked green are given higher forwarding priority than those marked yellow, and packets marked red are discarded.

TABLE 1

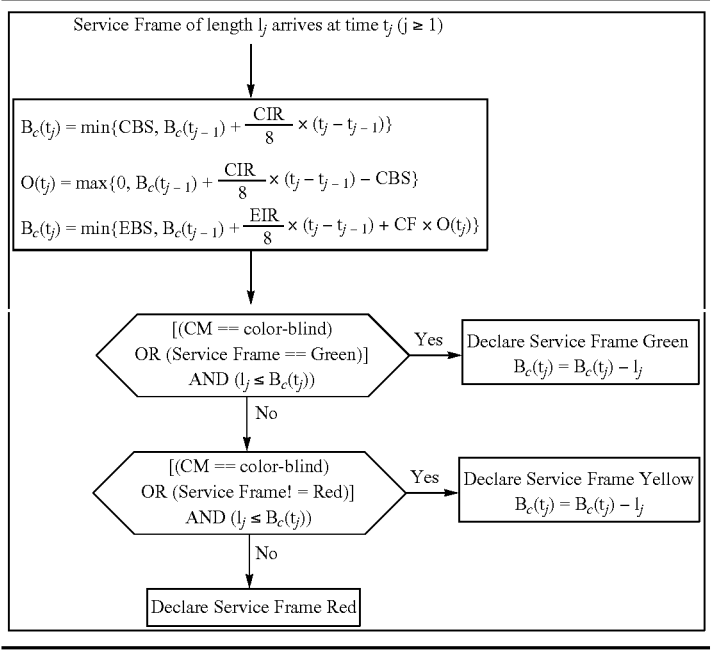

Conventional Rate Color Marker Algorithm

The existing rate color marker marks packets according to a VC bandwidth profile. However, a VC may carry packets from different Classes of Service (CoS). For example, a VC may carry voice traffic assigned to CoS 1, video traffic assigned to CoS 2, and Internet traffic assigned to CoS 3. Separating traffic into classes of service allow a service provider to provision better service quality to one CoS at the expense of other lower priority CoS. In this example, the service provider could provide better service to CoS 1, which carries voice traffic. Given that the bandwidth profile defined in MEF 10.1 does not distinguish classes of service within the VC when marking packets, some of the packets from CoS 1 may be marked yellow or even red due to excessive traffic from CoS 2 and 3.

Consider an example where an MEF 10.1 rate color marker with CIR=6 Mb/s (megabits per second) and EIR=4 Mb/s is used to meter a VC containing CoS 1, 2, and 3 with 4 Mb/s of traffic each on average. In this case, the VC presents a total of 12 Mb/s of traffic to the rate color marker. As a result, 6 Mb/s of packets in the traffic will be marked green on average, 4 Mb/s of the packets will be marked yellow on average, and 2 Mb/s of the packets will be marked red on average. The problem in this scenario is that there is no guarantee that CoS 1 will have all of its 4 Mb/s of traffic marked green on average. Depending on the traffic dynamics, CoS 2 or CoS 3 could have their packets marked green instead and leave CoS 1 with all of its packets marked yellow or red.

SUMMARY

One embodiment provides a system that facilitates bandwidth-profile enforcement. During operation, the system indicates a packet's compliance with a bandwidth profile based at least on available high-compliance tokens and medium-compliance tokens. The system further converts, within different classes of service (CoSs), an overflow high-compliance token to a medium-compliance token in the same CoS, in a top-down or bottom-up fashion with respect to different CoS priorities.

In some embodiments, whether a respective CoS level is allowed or precluded from sharing tokens with another CoS level is determined by a CoS-specific sharing flag.

In some embodiments, the system precludes an overflow token from a respective CoS level from being distributed to a CoS level of higher priority.

In some embodiments, whether an overflow high-compliance token from a respective CoS is allowed to be converted to a medium-compliance token is determined by a CoS-specific coupling flag.

In some embodiments, the number of overflow high-compliance tokens distributed to a respective CoS level is limited by an upper limit for high-compliance tokens for that CoS level.

In some embodiments, the number of overflow medium-compliance tokens distributed to a respective CoS level is limited by an upper limit for medium-compliance tokens for that CoS level.

In some embodiments, overflow high-compliance or medium-compliance tokens are distributed to other CoS priority levels in a strict-priority order.

In some embodiments, overflow high-compliance or medium-compliance tokens are distributed to other CoS priority levels based at least on a relative weight assigned to a respective CoS level.

In some embodiments, indicating the packet's compliance with the bandwidth profile comprises marking the packet green when the packet is in high compliance, yellow when the packet is in medium compliance, and red when the packet is in low compliance.

In some embodiments, a high-compliance token is designated as a green token, a medium-compliance token is designated as a yellow token, and a low compliance token is designated as a red token.

BRIEF DESCRIPTION OF THE FIGURES

FIG. 7 and FIG. 8 jointly present a mathematical representation of a strict-priority token sharing mechanism, in accordance with one embodiment of the present invention.

FIG. 9 presents the mathematical representation of a strict-priority token sharing mechanism that facilitates directional sharing and non-directional coupling, in accordance with one embodiment of the present invention.

FIG. 10A presents the mathematical representation of a strict-priority token sharing mechanism that facilitates directional sharing and top-down directional coupling, in accordance with one embodiment of the present invention.

FIG. 10B presents the mathematical representation of a strict-priority token sharing mechanism that facilitates directional sharing and bottom-up directional coupling, in accordance with one embodiment of the present invention.

FIG. 10C presents the mathematical representation of a strict-priority token sharing mechanism that facilitates directional sharing and top-down directional coupling, wherein the directional coupling is controlled by a CoS-specific coupling flag $CF^i$, in accordance with one embodiment of the present invention.

FIG. 11A and FIG. 11B jointly present the mathematical representation of a token sharing mechanism that facilitates weighted distribution of overflow tokens, in accordance with one embodiment of the present invention.

In the figures, like reference numerals refer to the same figure elements.

DETAILED DESCRIPTION

Overview

Figure 1:
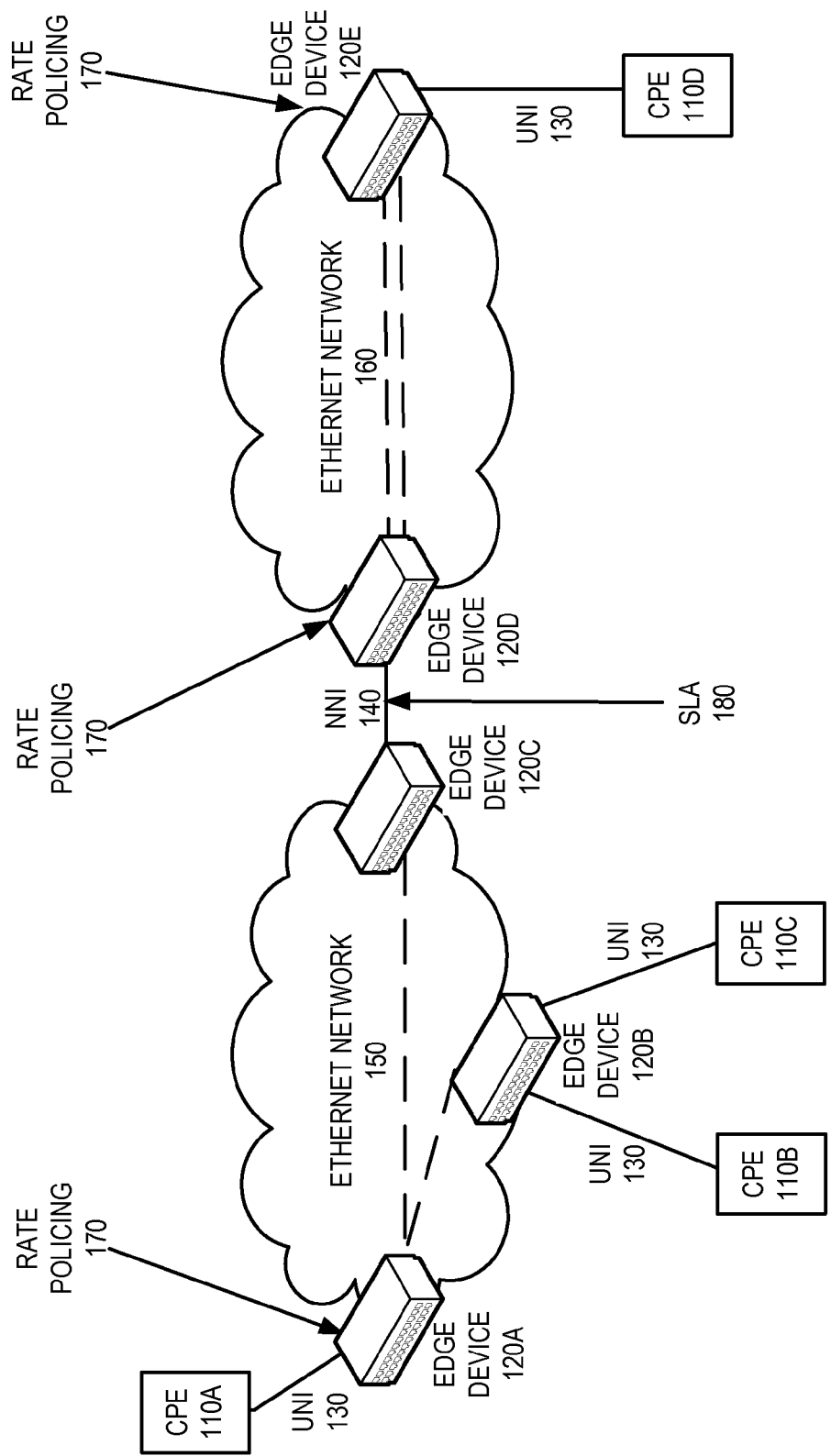
FIG. 1 presents a diagram illustrating a networking environment for rate policing using a hierarchical rate color marker in accordance with an embodiment.

In embodiments of the present invention, the problem of re-using unused guaranteed and best-effort bandwidth in a virtual circuit is solved by distributing the bandwidth to a different class of service or converting guaranteed bandwidth to best-effort bandwidth and distributing the converted bandwidth to one or more classes of service.

Specifically, in the scenario illustrated earlier, to address the problem that there is no guarantee that CoS 1 will have all of its 4 Mb/s of traffic marked green on average, a hierarchical bandwidth profile and a hierarchical rate color maker are desirable. Consider a hierarchical rate color maker with CIR=6 Mb/s and EIR=4 Mb/s for a VC containing CoS 1, 2, and 3 with 4 Mb/s of traffic each on average. In addition, the hierarchical rate color marker guarantees that CIR is divided among the classes of service such that CoS 1 receives 3 Mb/s of CIR, CoS 2 receives 2 Mb/s of CIR, and CoS 3 receives 1 Mb/s of CIR. In addition, EIR is divided among the classes of service such that CoS 1 receives 1 Mb/s of EIR, CoS 2 receives 1 Mb/s of EIR, and CoS 3 receives 2 Mb/s of EIR. As a result, now CoS 1 has 3 Mb/s of packets in its traffic marked green on average and 1 Mb/s of the packets marked yellow on average. CoS 2 has 2 Mb/s of packets in its traffic marked green on average and 1 Mb/s of the packets marked yellow on average. CoS 3 has 1 Mb/s of packets in its traffic marked green on average and 2 Mb/s of the packets marked yellow on average. This again adds to the same 6 Mb/s of the VC traffic being marked green on average, 4 Mb/s being marked yellow on average, and 2 Mb/s being marked red on average for the VC as a whole. The hierarchical rate color maker can mark packets according to the bandwidth allocations among the different classes of service.

Now consider the same example as above, but with CoS 1 with only 1 Mb/s of traffic on average. Given that 3 Mb/s of the VC CIR was allocated to CoS 1, 2 Mb/s of the VC CIR will be wasted due to insufficient CoS 1 traffic. Therefore, a hierarchical rate color marker that can dynamically re-allocate unused CIR and EIR is desirable.

In one embodiment, with respect to the example above, the unused 2 Mb/s of CIR could be distributed between CoS 2 and CoS 3 in a strict-priority fashion. The strict-priority distribution gives the entire 2 Mb/s bandwidth to CoS 2 first, and only gives the remaining unused bandwidth to CoS 3. In this example, a strict-priority distribution means that CoS 2 would have 4 Mb/s of its traffic marked green, i.e., all of its traffic would be marked green.

Alternatively, the unused 2 Mb/s of CIR could be distributed using a round-robin distribution scheme. Under a round-robin distribution scheme, equal portions of the unused 2 Mb/s VC CIR is distributed between CoS 2 and CoS 3. This distribution results in 1 Mb/s of additional CIR given to CoS 2 and CoS 3.

As another alternative, a weighted round-robin scheme can also be used. With the weighted round-robin scheme, the distribution is proportional to weights assigned to each CoS. For example, if CoS 2 has weight 3 and CoS 3 has weight 1, CoS 2 would receive 1.5 Mb/s additional CIR and CoS 3 would receive 0.5 Mb/s additional CIR. That is, CoS 2 would receive three times as much additional CIR as CoS 3.

In one embodiment, with respect to the example above, the unused 2 Mb/s CIR could be converted to EIR and distributed between CoS 2 and CoS 3 following either a strict-priority order distribution, a round-robin distribution scheme, or a weighted round-robin distribution scheme. Similarly, unused EIR can be distributed between CoS 2 and CoS 3 following either a strict-priority order distribution, a round-robin distribution scheme, or a weighted round-robin distribution scheme.

For convenience, color names are used in the present disclosure to distinguish among different levels of bandwidth profile. A high-compliance packet is marked with color green; a medium-compliance packet is marked with color yellow; and a low-compliance packet is marked with color red. Any other naming conventions can be used equivalently. Furthermore, the terms "frame" and "packet" are used interchangeably in this disclosure. The term "virtual circuit" refers to any form of emulated circuit, such as an Ethernet Virtual Connection.

Furthermore, although the examples presented herein are based on three classes of service, embodiments of the present invention can be applied to other numbers of classes of service, such as 4, 8, and 16. In addition, there can be various ways to denote different classes of service. For example, in one embodiment, CoS 1 can denote the highest class of service and CoS 3 the lowest. In another embodiment, CoS 3 may denote the highest class of service and CoS 1 the lowest. Note that in this disclosure, CoS 1 denotes the highest class of service and CoS 3 the lowest. In addition, a scheme where the relative priority of a CoS level can be provisioned irrespective of its numbering. For example, from high to low priority, one could designate CoS 3, CoS 1, and CoS 2, respectively. In other words, the absolute value of a CoS index does not necessarily correlate to that CoS level's priority.

In this disclosure, the term "packet" refers to any data packet or group of bits that carries data and can be transmitted from a source node to a destination node. A packet can be an Ethernet frame or a group of bits based on an open or proprietary format. The embodiments described herein are not limited to Ethernet networks, and can be applied in any network with different protocols, on different layers. Such networks include but are not limited to, Internet Protocol (IP) networks, frame relay networks, Asynchronous Transfer Mode (ATM) networks, Synchronous Optical Network (SONET) or Synchronous Digital Hierarchy (SDH) networks, Point-to-Point (PPP) networks, digital subscriber line (DSL) networks, etc.

Networking Environment

FIG. 1 presents a diagram illustrating a networking environment for rate policing using a hierarchical rate color marker in accordance with an embodiment. In this example, the networking environment includes two Ethernet networks, i.e., network 150 and network 160, and multiple customer premise equipments (CPEs) 110A-D. The CPEs are coupled to the Ethernet networks through edge devices 120A, 120B, and 120E, which implement a user-network interface (UNI) 130. A UNI 130 is a demarcation point between the responsibility of a service provider and the responsibility of a subscriber. UNI 130 serves as an ingress/egress point for all interactions between a subscriber and a service provider. Network 150 and network 160 are coupled via edge devices 120C and 120D. The edge devices 120C and 120D implement a network-network interface (NNI) 140 used to couple two Ethernet service providers and to specify Service Level Agreement (SLA) 180 between the two providers. An SLA is typically a contract specifying the agreed to service level commitments and related business agreements between two service providers or a subscriber and a service provider. Ethernet traffic rate policing using hierarchical rate color marker disclosed in the present invention can take place at an ingress of an Ethernet for policing incoming network traffic, e.g., edge device 120A, an egress of an Ethernet for policing outgoing network traffic, e.g., edge device 120E, an egress switch point that couples to Ethernet networks, e.g., edge device 120C, or an ingress switch point that couples two Ethernet networks, e.g., edge device 120D.

Bandwidth Profile

Figure 2:
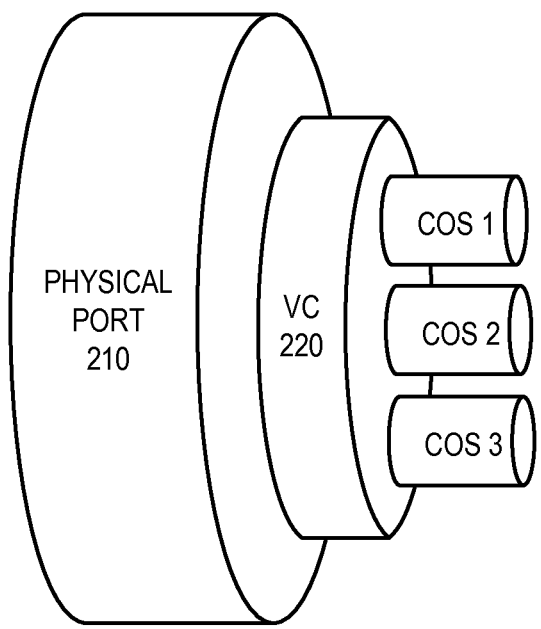
FIG. 2 presents a diagram illustrating a Virtual Circuit (VC) bandwidth profile in accordance with an embodiment.

FIG. 2 presents a diagram illustrating a Virtual Circuit (VC) bandwidth profile in accordance with an embodiment. In this example, a physical port 210 can correspond to a network port on an edge device. A physical port may accommodate multiple virtual circuits, such as VC 220, which can be an Ethernet Virtual Connection (EVC). Each virtual circuit has a bandwidth profile. A respective bandwidth profile has one or more parameters, which identify service attributes of the VC. The service attributes facilitate determining how packets within a VC are to be forwarded. For example, the parameters may include the amount of guaranteed bandwidth and best-effort bandwidth assigned to the VC.

A Class of Service (CoS) refers to a commitment from the service provider to provide a particular level of performance. In this example, VC 220 is associated with three classes of service, i.e., CoS 1, CoS 2, and CoS 3. In particular, CoS 1 packets will receive a high level of service such as guaranteed bandwidth, low latency, low jitter, low packet-loss rate, and high availability. CoS 2 packets will receive a medium level of service, and CoS 3 packets will receive a low level of service. For example, a VC may carry voice traffic assigned to CoS 1, video traffic assigned to CoS 2, and Internet traffic assigned to CoS 3.

In one embodiment, a hierarchical bandwidth profile defines a separate set of parameters for each individual CoS within a VC and a set of global parameters for the VC as a whole. For a VC with n classes of service, where n is typically an integer number from 1 to 8, a hierarchical bandwidth profile includes 9n+1 parameters <$CIR^i$, $CIR^i_{max}$, $CBS^i$, $EIR^i$, $EIR^i_{max}$, $EBS^i$, $CF^i$, $CM^i$, $SF^i$, $CF$>, for i=1 to n, where:

$CIR^i$ is the Committed Information Rate of CoS i expressed as bits per second. CIR defines the average data rate in bits/s up to which the network can deliver packets and meets the performance objectives defined by the CoS service attribute.

$CIR^i_{max}$ is the maximum Committed Information Rate of CoS i expressed as bits per second. $CIR_{max}^1$ determines the maximum CIR rate CoS i is allowed to achieve when receiving unused green tokens from other CoS levels.

$CBS^i$ is the Committed Burst Size of CoS i expressed as bytes (or data units). CBS limits the maximum number of tokens available for a burst of packets sent at the UNI speed to remain CIR-conformant.

$EIR^i$ is the Excess Information Rate of CoS i expressed as bits per second. EIR defines the average data rate in bits/s up to which the network may deliver packets but without any performance objectives (e.g., bandwidth used for best-effort delivery of traffic).

$EIR^i_{max}$ is the maximum Excess Information Rate of CoS i expressed as bits per second. $EIR^i_{max}$ determines the maximum EIR rate CoS i is allowed to achieve when receiving unused yellow tokens from other CoS levels.

$EBS^i$ is the Excess Burst Size of CoS i expressed as bytes. EBS limits the maximum number of tokens available for a burst of packets sent at the UNI speed to remain EIR-conformant.

$CF^i$ is the Coupling Flag of CoS i with two possible values, 0 or 1. $CF^i$ allows the choice between two modes of operation of the rate enforcement algorithm with respect to converting unused committed bandwidth (e.g., for traffic served with guaranteed QoS) to excess bandwidth (e.g., for traffic served with best-effort QoS) in the same CoS. Note that in this disclosure the term "coupling" refers to the process of converting a green token to a yellow token and allowing one or more CoS levels to use the converted yellow tokens $CM^i$ is the Color Mode of CoS i with two possible values, "color-blind" or "color-aware." CM indicates whether the color-aware or color-blind property is employed by the bandwidth profile.

$SF^i$ is the Sharing Flag of CoS i with two possible values, 0 or 1. $SF^i$ allows the choice between two modes of operation of the rate enforcement.

CF is the global Coupling Flag with two possible values, 0 or 1. CF can be used to determine whether the remaining committed bandwidth in each CoS (after being shared among different CoS levels) can be converted to excess bandwidth of the same CoS. CF is a VC-wide variable.

With the above parameters, the following VC parameters can be derived:

EIR is the Excess Information Rate of the VC expressed as bits per second, where EIR is equal to the sum of $EIR^i$ for i=1 to n.

CIR is the Committed Information Rate of the VC expressed as bits per second, where CIR is equal to the sum of $CIR^i$ for i=1 to n.

Hierarchical Rate Color Marker

Figure 3A:
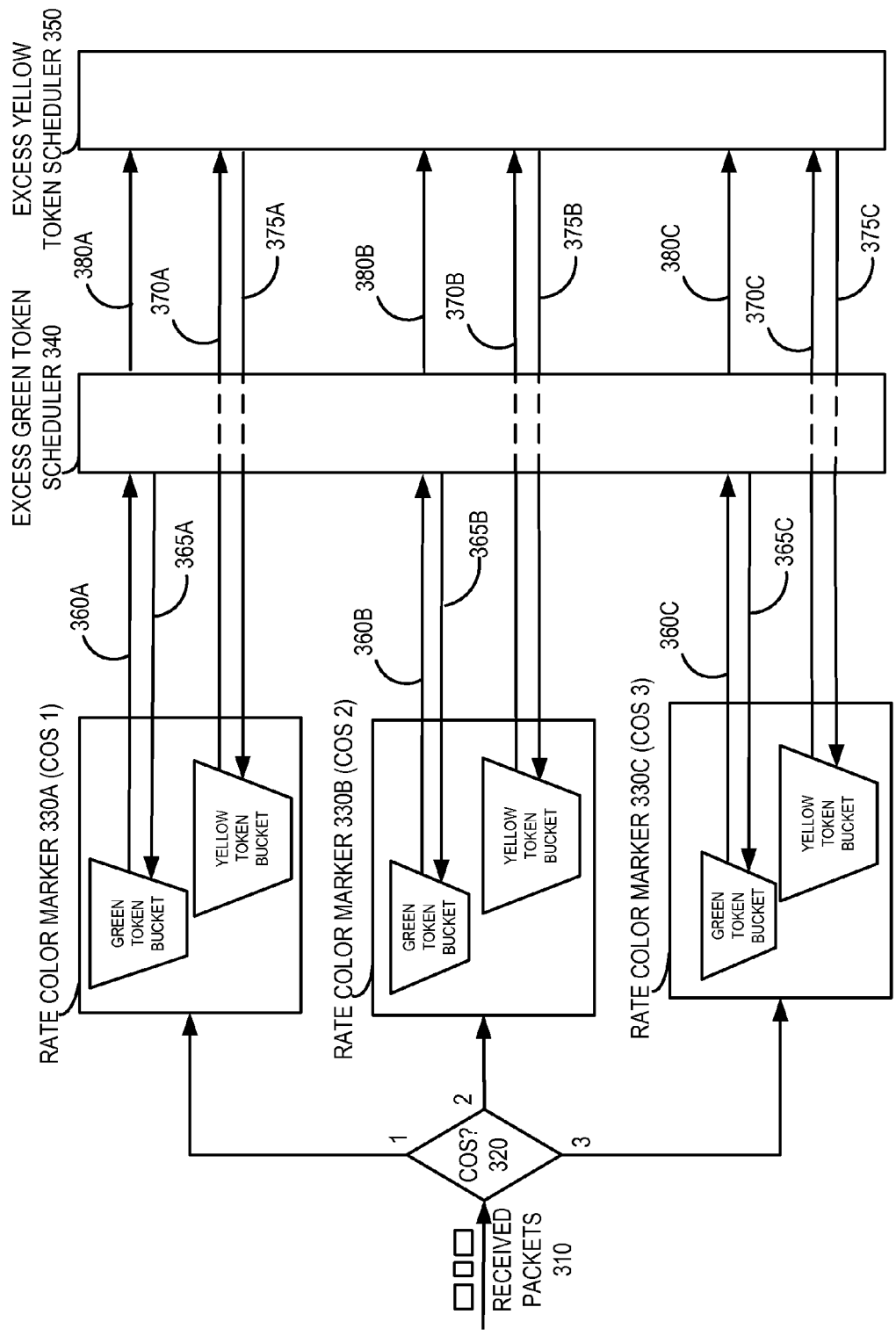
FIG. 3A presents a diagram illustrating a hierarchical rate color marker in accordance with an embodiment.

FIG. 3A presents a diagram illustrating a hierarchical rate color marker in accordance with an embodiment. The diagram shows a high level view of how the hierarchical rate color marker operates. When packets 310 are received, the CoS 320 of the packets are determined. If the CoS of a packet is CoS 1, the packet is sent to a rate color marker 330A for processing. Similarly, CoS 2 packets are sent to rate color marker 330B, and CoS 3 packets are sent to rate color marker 330C. The hierarchical rate color marker declares each packet to be compliant or non-compliant relative to the bandwidth profile. The level of compliance is expressed as one of these colors: green, yellow, and red. A packet marked red is dropped immediately, because forwarding it would violate the corresponding bandwidth profile. A packet marked green is forwarded because it is in compliance with the bandwidth profile. A packet marked yellow is forwarded on a best-effort basis when there is available or excess bandwidth.

For illustration purposes only, imagine that a color marker has a green token bucket and a yellow token bucket, which are configured to receive green and yellow tokens respectively. A packet can be marked green only if sufficient green tokens are available in the green token bucket of the corresponding CoS. Likewise, a packet can be marked yellow only if sufficient yellow tokens are available in the yellow token bucket of the corresponding CoS. Although the hierarchical rate color marker described in FIG. 3A includes three classes of service, any number of classes of service can be specified in a hierarchical rate color marker.

A token corresponds to a unit of data such as one byte. Depending on the bandwidth profile, certain numbers of green and yellow tokens are added periodically to respective token buckets. For example, if the CIR for a particular CoS is 1 Mb/s, and one token corresponds to one byte, the green token bucket for that CoS would receive 125 tokens every millisecond. Note that although the following description is based on the operation of token buckets, in real implementation the system may only use counters to account for the corresponding number of tokens, and there may not be any actual "bucket." The counter for tokens can be updated periodically or when a packet is received. For example, the counter for a given token bucket can be updated when a packet arrives (but before the packet is marked with a color), be updated every millisecond, or every 0.1 millisecond. The length of the update period is implementation specific. In the formal definitions of the algorithms described in this disclosure, an infinitesimally small update period is supported where infinitesimally small fractions of tokens are added to token buckets. However, different embodiments can use update periods of sufficiently practical length and only allow for the addition of whole tokens to token buckets. Such implementations will impose finite granularity to the rates it can support. For example, adding tokens every millisecond implies that the rate granularity is 1 token every millisecond. In one embodiment, where one token corresponds to one byte, the rate granularity is 8,000 bits per second. This means that a rate of 16,000 bits per second can be defined, but a rate of 14,000 bits per second cannot. Therefore, embodiments may define different update periods for different rate ranges to improve rate granularity. For example, an embodiment may update token buckets at every 0.1 millisecond for rates lower than 100,000 bits per second to provide a rate granularity of 800 bits per second in this range, and may update token buckets every 1 millisecond for rates above 100,000 bits per second. Other implementations may support various update rates for various rate ranges.

It is possible that a port may not receive any traffic for a certain CoS for an extended period. As a result, the green or yellow token bucket of the corresponding CoS can overflow when the green/yellow tokens are received at a higher rate than incoming packets. Depending on the value of $SF^i$, the rate color markers 330A-C for CoS i (i=1 to 3) can send the overflow green tokens to Excess Green Token Scheduler (EGTS) 340 (operations 360A-C). That is, $SF^i$ functions as a switch for CoS i to turn on or off the re-distribution of overflow tokens to other CoS levels. EGTS 340 can distribute the received overflow green tokens to the green token bucket of another CoS (operations 365A-C). Likewise, based on the value of $SF^i$, the rate color markers 330A-C for CoS i (i=1 to 3) can discard overflow yellow tokens or send them to the Excess Yellow Token Scheduler (EYTS) 350 (operations 370A-C). EYTS 340 can distribute the received overflow yellow tokens to the yellow token bucket of another CoS (operations 375A-C).

In some embodiments, depending on the value of CF, EGTS 340 may convert a remaining green token (after re-distribution of the overflow green tokens to other CoS levels) to a yellow token, and send the converted yellow token to EYTS 350 (operation 380A-C). $CF^i$ serves as a per-CoS switch to determine whether overflow green tokens can be converted to yellow tokens when $SF^i=0$.

Specifically, when $SF^i=0$, CoS i does not share tokens (either green or yellow) with other CoS levels. That is, CoS i does not share its overflow tokens (green or yellow) and does not receive re-distributed unused tokens from EGTS 340 or EYTS 350. When $SF^i=1$, CoS i gives all of its overflow green tokens to EGTS 340 regardless of the value assigned to $CF^i$. In addition, when $SF^i=1$, CoS i gives its entire overflow yellow tokens to EYTS 350. When $SF^i=0$ and $CF^i=0$, CoS i discards all overflow green tokens. When $SF^i=0$ and $CF^i=1$, CoS i converts overflow green tokens to yellow tokens and send the converted yellow tokens to the yellow token bucket of CoS i. When $SF^i=0$, CoS i discards all overflow yellow tokens, since it is not useful to convert yellow tokens to red tokens.

The EGTS distributes green tokens among classes of service that are qualified to receive green token distribution from the EGTS. A CoS i is qualified to receive a green token distribution from the EGTS if its green token bucket is not full and the corresponding $SF^i=1$. The number of green tokens given to each CoS depends on the space available for additional green tokens in each CoS (which is determined by the corresponding $CBS^i$), the corresponding $CIR_{max}{}^i$ rate, and the defined distribution discipline, e.g., strict-priority, round-robin (RR), or weighted round-robin (WRR). Any unused green tokens from the EGTS after distribution are converted to yellow tokens and given to the EYTS if the global Coupling Flag (CF) is set to 1. If CF is set to 0, these unused green tokens are discarded.

The EYTS distributes yellow tokens among classes of service that are qualified to receive a yellow token distribution from the EYTS. A CoS is qualified to receive a yellow token distribution from the EYTS if its yellow token bucket is not full and $SF^i=1$. The number of yellow tokens given to each CoS depends on the space available for additional yellow tokens in each CoS (which is determined by the corresponding $EBS^i$), the corresponding $EIR_{max}{}^i$, and the defined distribution discipline, e.g., strict-priority, RR, or WRR. Any unused yellow tokens from the EYTS after distribution are discarded.

The distribution of excess tokens by the EGTS and the EYTS can be done periodically or be triggered by certain events, such as packet arrivals.

Figure 3B:
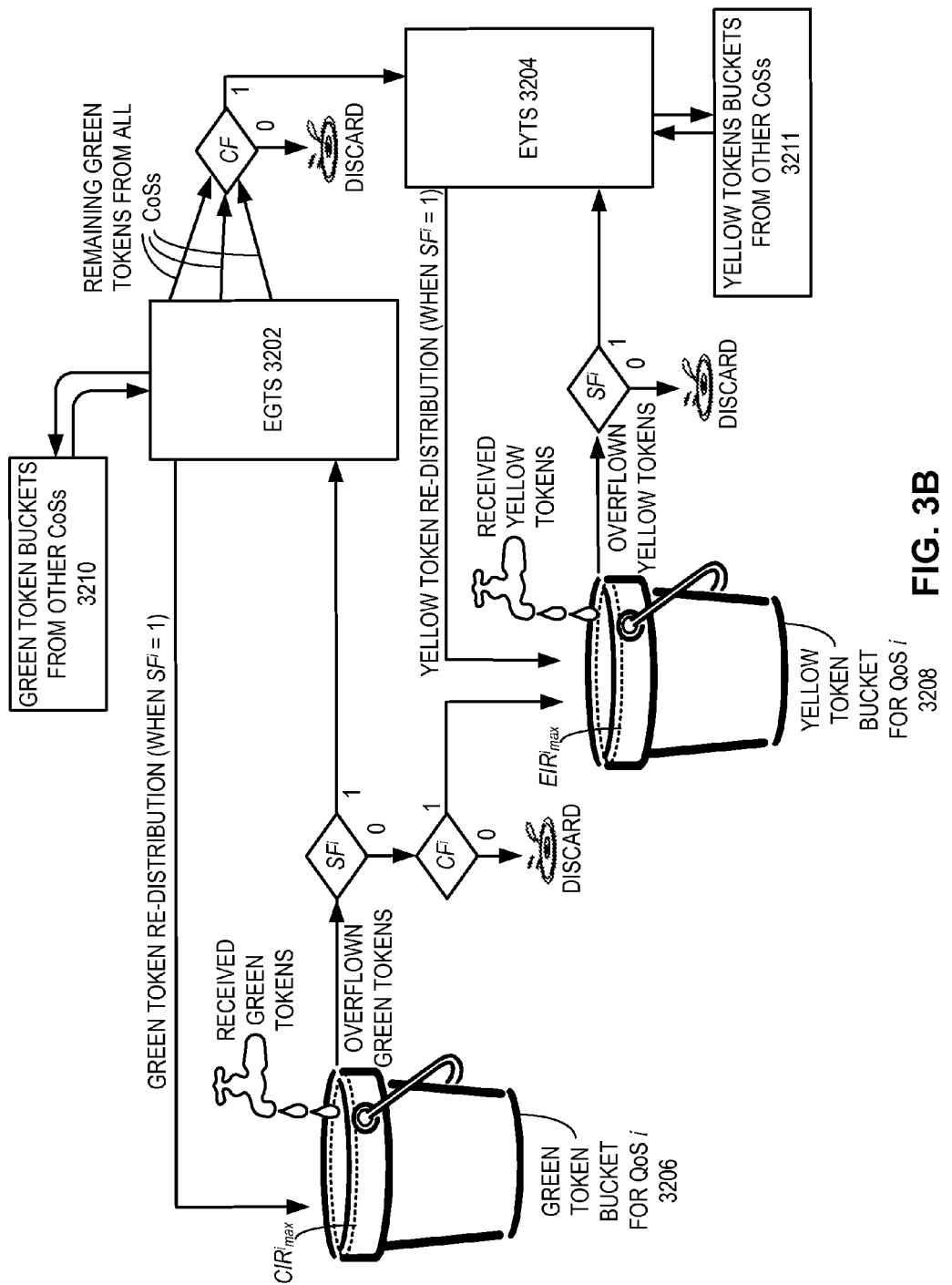
FIG. 3B presents a block diagram illustrating the operation of a hierarchical rate color marker in accordance with an embodiment.

FIG. 3B illustrates an exemplary architecture of a hierarchical rate color marker, in accordance with one embodiment of the present invention. The system includes two excess token schedulers, namely EGTS 3202 and EYTS 3204. Each scheduler is responsible for distributing excess tokens of the corresponding color for all the CoS levels. For example, EGTS 3202 is responsible for accounting for the excess green tokens from green token bucket 3206 for QoS i as well as green token buckets 3210 of other CoS levels. EYTS 3204 is responsible for accounting for the excess yellow tokens from yellow token bucket 3208 for CoS i as well as yellow token buckets 3211 from other CoS levels. The following description explains how the excess tokens are processed, starting from green token bucket 3206. Note that FIG. 3B is only for illustration purposes and explains the logical relationship and flow of tokens between CoS levels. The actual implementation may take various forms. For example, the re-distribution and coupling (conversion) of tokens may be triggered by certain events, such as arrival of a packet, or be performed periodically, for example, every 10 milliseconds.

During operation, green token bucket 3206 for QoS i keeps receiving green tokens (in practice, a counter which corresponds to green token bucket 3206 can be updated when a packet arrives or at periodic intervals, based on a token-receiving rate corresponding to $CIR^i$). The number of tokens in bucket 3206 is capped by $CBS^i$. The overflow (excess) green tokens may optionally be handed to EGTS 3202, depending on the sharing flag ($SF^i$). If $SF^i=1$, the overflow tokens are handled by EGTS 3202. If $SF^i=0$, the overflow green tokens are not allowed to be shared with other CoS levels. The system further determines whether the CoS-specific coupling flag, $CF^i$, is set. If $CF^i=1$, the overflow green tokens are converted to yellow tokens and placed in the yellow token bucket 3208 of the same CoS. If $CF^i=0$, the overflow green tokens are discarded.

EGTS 3202 collects overflow green tokens from bucket 3206 as well as buckets 3210 from other CoS levels. EGTS 3202 then re-distributes the overflow green tokens to the different CoS levels, if a respective CoS has its $SF^i$ set to 1. In one embodiment, the overflow green tokens collected by EGTS 3202 retain their CoS information. EGTS 3202 can track from which CoS an overflow green token is collected. EGTS 3202 can then apply different token-sharing schemes, such as strict-priority-based or weighted-distribution-based schemes, to re-distribute the overflow green tokens among the different CoS levels. EGTS 3202 can further use the retained CoS information to implement directional sharing by allowing overflow green tokens from a respective CoS to be shared only with lower-priority CoS levels. More details on directional sharing are provided below.

It is possible that there are un-distributed overflow green tokens left after the re-distribution (for example, when each CoS has received the maximum number of overflow green tokens allowed by the re-distribution scheme). The system then determines whether the global coupling flag, CF, is set. If CF=1, the remaining green tokens are converted to yellow tokens and subsequently handled by EYTS 3204. In one embodiment, the converted yellow tokens can retain their original CoS information. That is, EYTS 3204 can track the CoS information of a converted yellow token, which is referred to as "directional coupling" in this disclosure. The retained CoS information can then be used to perform directional sharing, where a converted yellow token can only be shared with a CoS that is of equal to or lower priority than the original CoS associated with the green token before it is converted to the yellow token.

Similar to green token bucket 3206, yellow token bucket 3208 regularly receives yellow tokens and the overflow yellow tokens are handled by EYTS 3204 if $SF^i=1$. If $SF^i=0$, the overflow yellow tokens are discarded. EYTS 3204 collects overflow yellow tokens from bucket 3208 as well as buckets 3211 from other CoS levels. EYTS 3202 then re-distributes the overflow yellow tokens and converted yellow tokens to the different CoS levels, if a respective CoS has its $SF^i$ set to 1. In one embodiment, the overflow yellow tokens collected by EYTS 3204 retain their CoS information. EYTS 3204 can track from which CoS level an overflow yellow token is collected or converted yellow. EYTS 3204 can then apply different token-sharing schemes, such as strict-priority-based or weighted-distribution-based schemes, to re-distribute the overflow yellow tokens among the different CoS levels. EYTS 3204 can further use the retained CoS information to implement directional sharing by allowing overflow green tokens from a respective CoS to be shared only with lower CoS priority levels. More details on directional sharing are provided below.

Figure 3C:
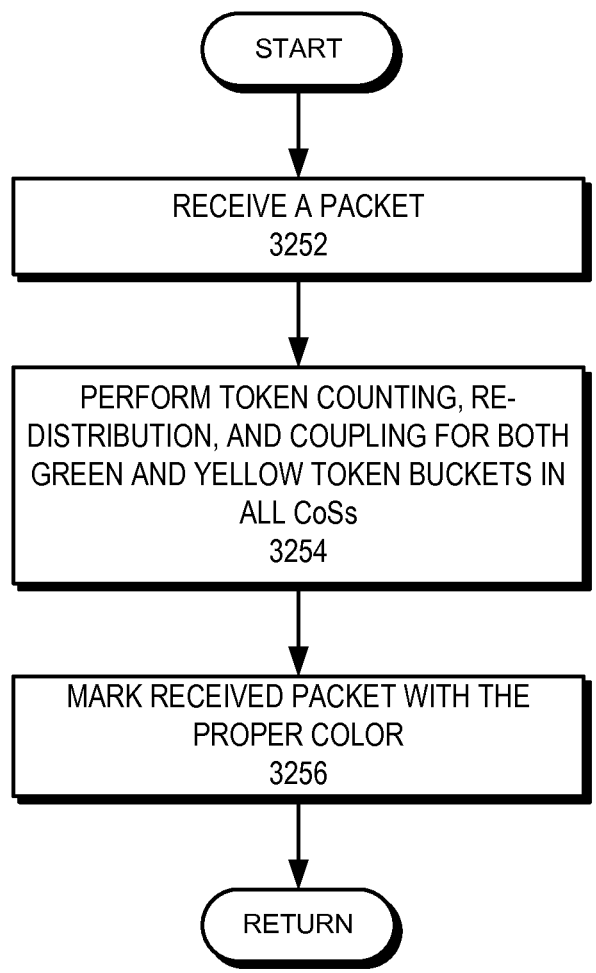
FIG. 3C presents a flowchart illustrating an exemplary process of token redistribution, in accordance with one embodiment of the present invention.

As described above, the counting, sharing, and coupling of tokens can be performed periodically or can be triggered by specific events, such as packet arrivals. FIG. 3C presents a flowchart illustrating an exemplary process of token redistribution, in accordance with one embodiment of the present invention. During operation, the system receives a packet (operation 3252). The system then performs the token counting, re-distribution, and coupling for both green and yellow token buckets in all CoS levels (operation 3254). After the tokens counts are updated, the system marks the received packet with the proper color based on the packet's compliance with the bandwidth profiling corresponding to the packet's CoS.

Figure 3D:
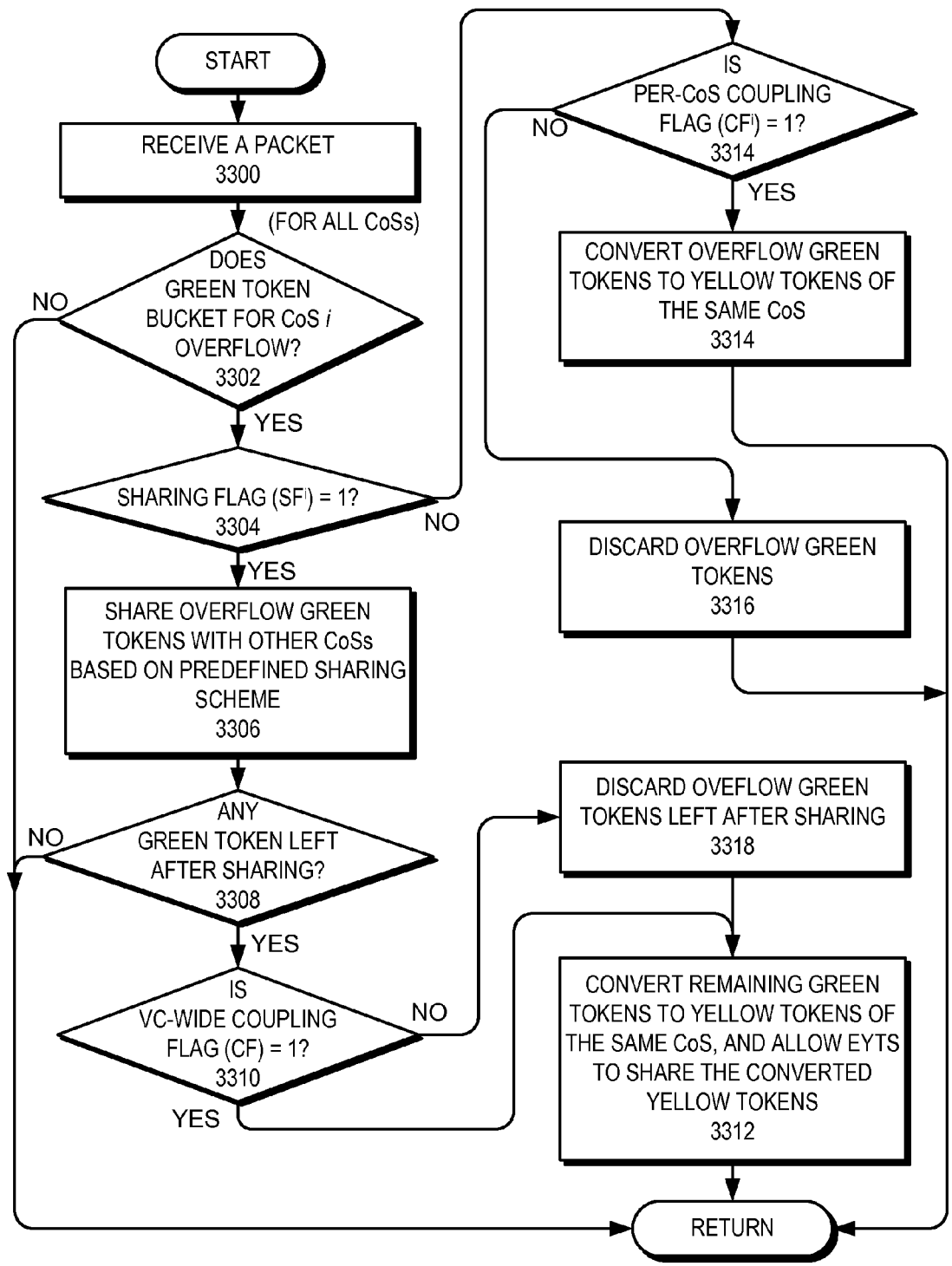
FIG. 3D presents a flowchart illustrating the operations of a hierarchical rate color marker in accordance with an embodiment of the present invention.

FIG. 3D presents a flowchart illustrating the operations of a hierarchical rate color marker in accordance with an embodiment. Although the example described in FIG. 3D is based on the operation of EGTS, the process is generally applicable to any other token redistribution component, such as EYTS. During operation, the system first receives a packet (operation 3300). The system then performs the following operations (until the "return" operation) for all CoS levels, before marking the received packet with a proper color.

The system first determines whether the green token bucket for CoS i overflows (operation 3302). If not, the system returns. If the bucket overflows, the system further determines whether $SF^i=1$ (operation 3304). If $SF^i=0$, the system further determines whether the per-CoS coupling flag $CF^i=1$ (operation 3314). If $CF^i=0$, the system discards the overflow green tokens (operation 3316) and returns. If $CF^i=1$, the system converts the overflow green tokens to yellow tokens of the same CoS, and returns (operation 3314).

If the sharing flag $SF^i=1$ (operation 3304), the EGTS shares the overflow green tokens with other CoS levels based on the predefined sharing scheme (operation 3306). The rate color marker algorithm may choose to share tokens, for example, in a strict-priority order or in a weighted fashion. If tokens are distributed in a strict-priority order, the algorithm can further specify whether it allows for directional or non-directional sharing, and whether it allows for directional or non-directional coupling. The system then determines if there are any green tokens left after sharing (operation 3308). If not, the system returns. Otherwise, the system determines whether the VC-wide coupling flag CF=1 (operation 3310). If CF=1, the system converts the remaining green tokens to yellow tokens of the same CoS, and allows the EYTS to share the converted yellow tokens (operation 3312). If CF=0, the system discards the remaining overflow green tokens left after sharing (operation 3318) and returns.

Token Distribution Schemes

Figure 4:
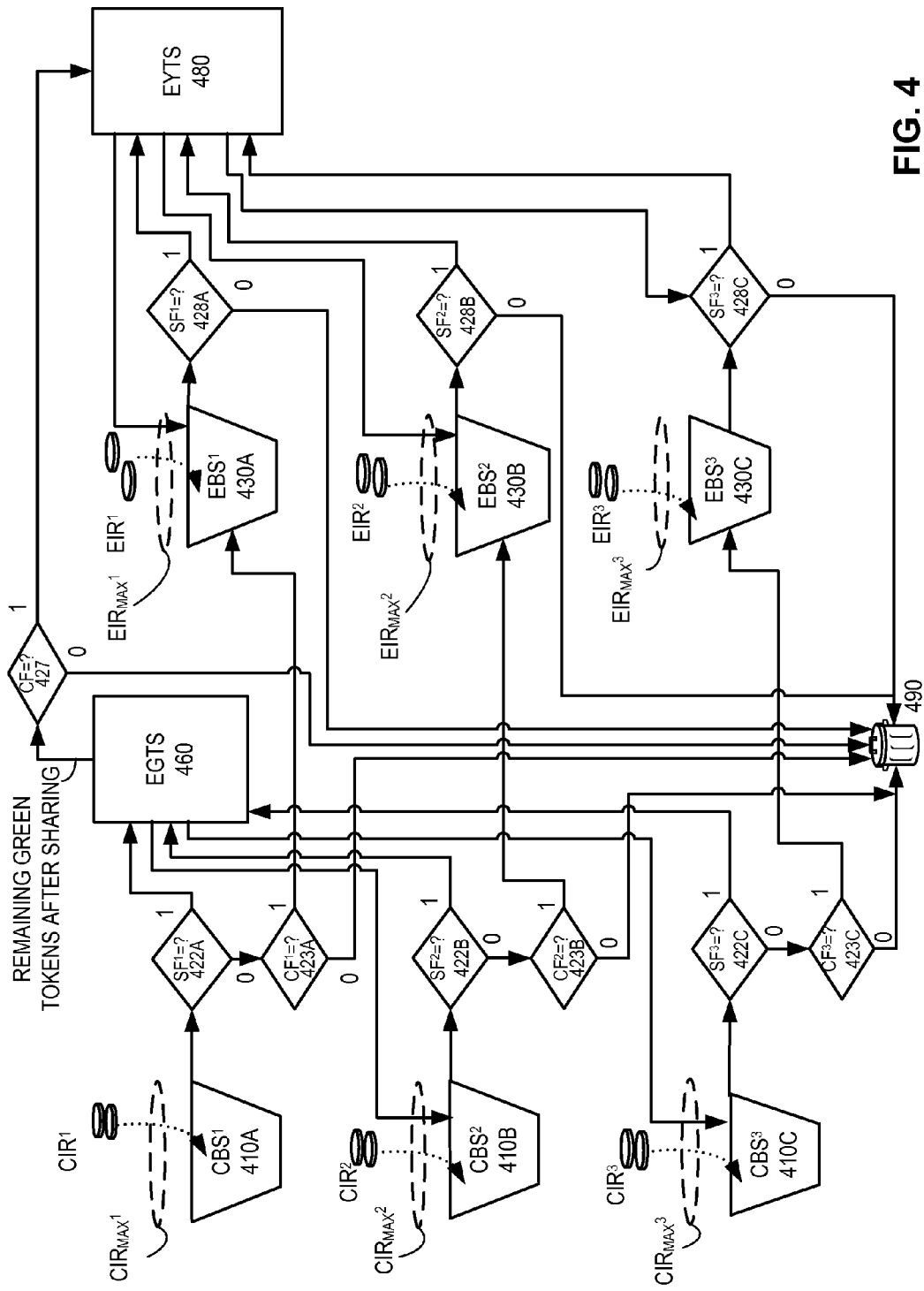
FIG. 4 illustrates an exemplary hierarchical rate color marker in accordance with one embodiment of the present invention.

FIG. 4 presents an exemplary hierarchical rate color marker in accordance with one embodiment. Referring to FIG. 4, during operation, green token buckets 410A-C receive green tokens at a frequency determined by their respective $CIR^i$ of CoS i. Tokens overflowing from a respective green token bucket are sent to EGTS 460 when the corresponding $SF^i=1$ (operations 422A-C). When a respective $SF^i=0$ the overflow green tokens are converted to yellow tokens and sent to the corresponding yellow token bucket 430A, 430B, or 430C of the same CoS, when the corresponding $CF^i=1$ (operations 423A-C). When $CF^i=0$, the overflow green tokens are discarded (operation 490).

Likewise, the yellow token buckets 430A-C receive yellow tokens at a frequency rate determined by their respective $EIR^i$ of CoS i. Tokens overflowing a yellow token bucket 430A, 430B, or 430C are either sent to EYTS 480 when $SF^i=1$ (operation 428A-C), or discarded when $SF^i=0$ (operation 490).

When a packet arrives, EGTS 460 distributes excess green tokens to green token buckets 410A-C of a corresponding CoS i where $SF^i=1$, and EYTS 480 distributes excess yellow tokens to yellow token buckets 430A-C of a corresponding CoS i where $SF^i=1$. Moreover, EGTS 460 limits the green tokens distributed to the green bucket of CoS i to $CIR^i_{max}$ and EYTS 480 limits the yellow tokens distributed to the yellow bucket of CoS i to $EIR^i_{max}$.

EGTS 460 and EYTS 480 can distribute tokens based on various schemes, such as a strict-priority order, round robin, or weighted round robin. When token sharing is based on a strict-priority order, EGTS 460 or EYTS 480 first distributes the overflow token to the green or yellow bucket of the highest CoS (CoS 1 in this case) until the corresponding $CBS^i$ and $CIR^1_{max}$ or $EBS^i$ and $EIR^i_{max}$ is reached. Then, EGTS 460 or EYTS 480 distributes the remaining green or yellow tokens to the next highest CoS, until its limit is reached, as so on.

Token sharing can be further divided into directional sharing and non-directional sharing. In directional sharing, the overflow green (or yellow) tokens from a respective CoS can only be shared with a lower CoS. Similarly, the process of coupling (i.e., conversion of green tokens to yellow tokens) can also be divided into directional and non-directional coupling. In directional coupling, a yellow token which is converted from a green token can only be distributed to a CoS that is equal to or lower than the original CoS to which the green token belongs. To facilitate directional sharing or direction coupling EGTS 460 and EYTS 480 both retain the CoS information of an overflow token.

With directional CIR sharing, spare CIR rate from CoS i can only be used by CoS j for which j>i. Similarly, with directional EIR sharing, spare EIR rate from CoS i can only be used by CoS j for which j>i. With non-directional coupling, any remaining spare CIR rate after distribution is converted to spare EIR for distribution when CF=1. However, "converted EIR" rate can be used by any CoS. For example, converted EIR rate from CoS 3 can be used by CoS 1.

The following sections provide more details on different token sharing schemes (e.g., strict-priority or weighted round robin, directional or non-directional) and coupling modes (directional or non-directional).

Strict-Priority-Based Token Sharing

Figure 5:
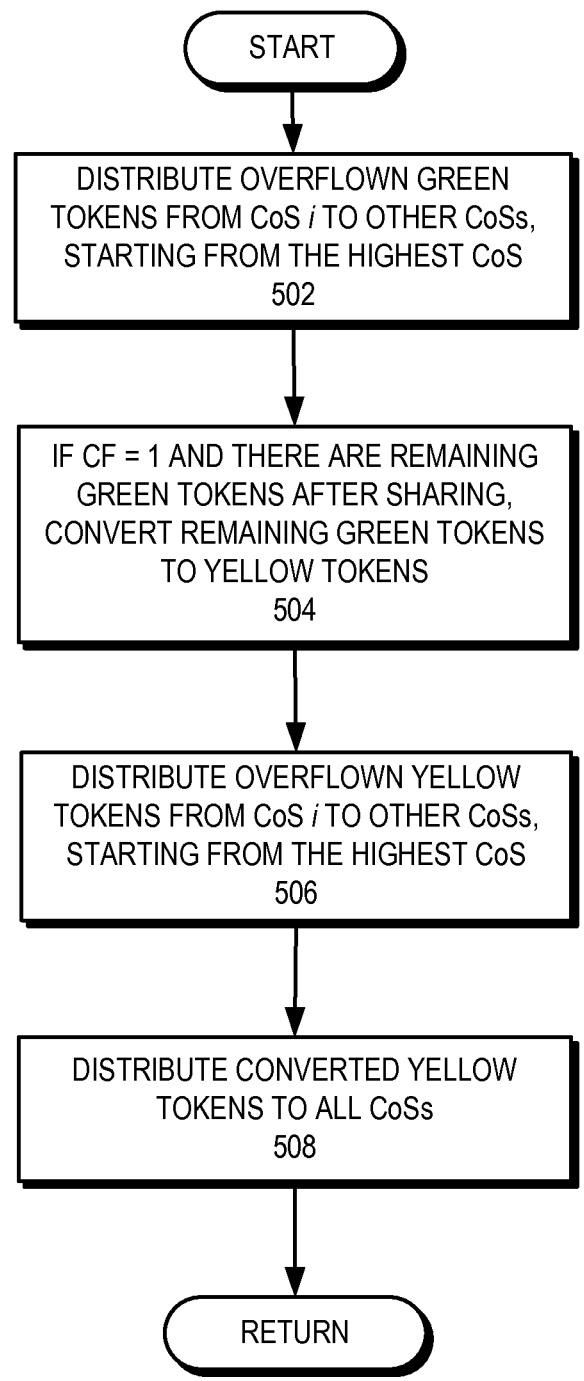
FIG. 5 presents a flowchart illustrating a hierarchical rate color marker algorithm which supports token distribution in strict-priority order in accordance with an embodiment of the present invention.

FIG. 5 presents a flowchart illustrating a hierarchical rate color marker algorithm which supports token distribution in strict-priority order in accordance with an embodiment. During operation, assuming that all the $SF^i=1$, the system first distributes the overflow green tokens from CoS i to other CoS levels, starting from the highest CoS (CoS 1), and performs this operation for each CoS (operation 502). The number of shared green tokens received at each CoS j is limited by the corresponding $CBS^i$ and $CIR^i_{max}$. Next, if CF=1 and there are remaining green tokens after sharing, the system converts the remaining green tokens to yellow tokens (operation 504). The system then performs a similar operation for the yellow tokens. That is, the system distributes the overflow yellow tokens from CoS i to other CoS levels, starting from the highest CoS (operation 506). Operation 506 is performed for all the CoS levels, and the number of shared yellow tokens received by CoS j is limited by the corresponding $EBS^i$ and $EIR^i_{max}$. Subsequently, the system distributes the converted yellow tokens (which is the result of operation 504) to all the CoS levels following a strict-priority order (operation 508).

Figure 6:
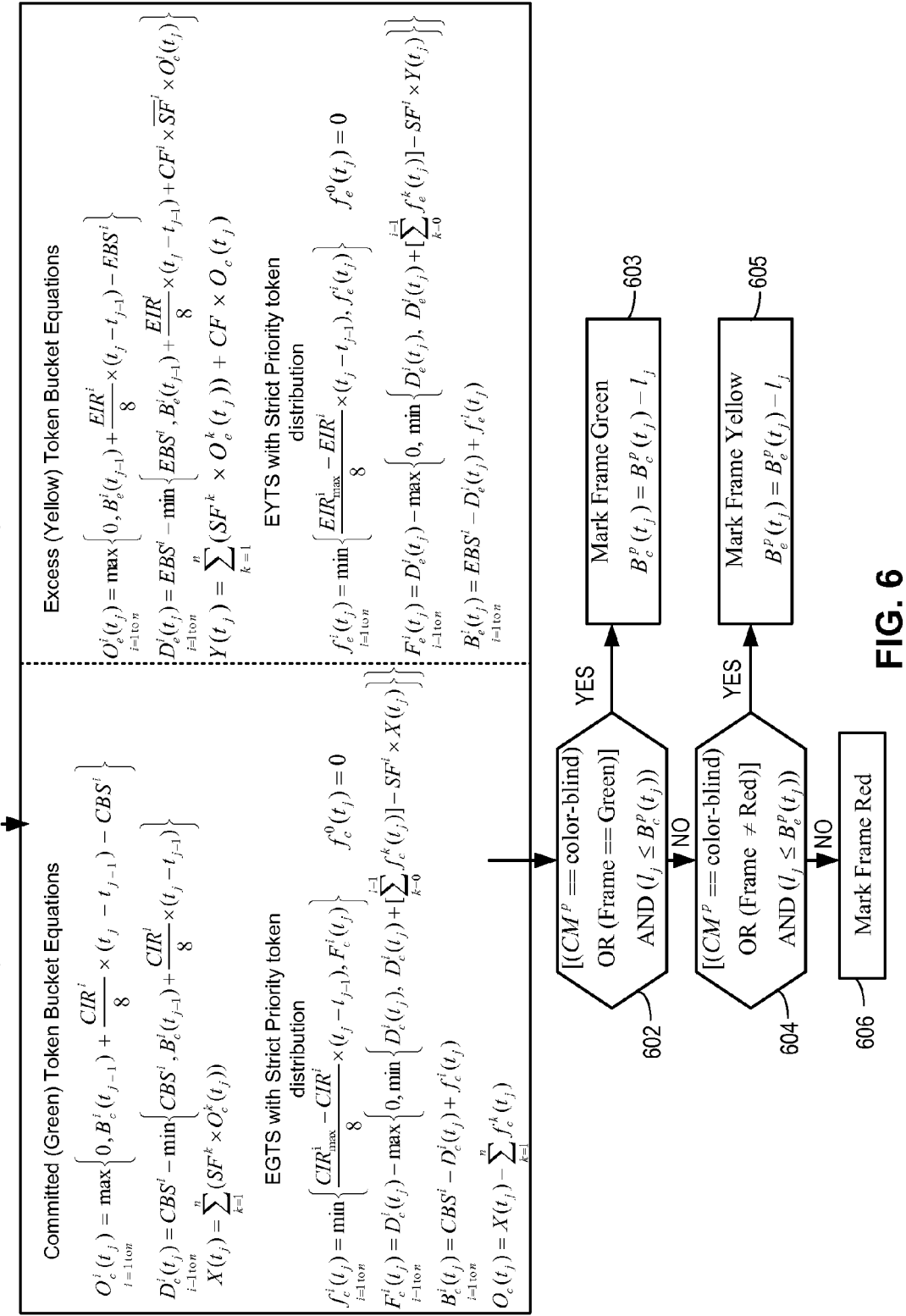
FIG. 6 presents a mathematical representation of a strict-priority token sharing mechanism, in accordance with one embodiment of the present invention.

FIG. 6 presents a mathematical representation of a strict-priority token sharing mechanism, in accordance with one embodiment. In this representation, it is assumed that the token sharing and coupling occurs when a frame of length $l_j$ arrives at time $t_j$, where $j>=1$, and $t_{j+1}>t_j$. The following notations are used:

$O^i_c(t_j)$ and $O^i_e(t_j)$ denotes the numbers of overflow tokens from the green and yellow token buckets for CoS i, respectively, during the time interval of the time from $t_{j-1}$ to $t_j$.

$D^i_c(t_j)$ and $D^i_e(t_j)$ denote the numbers of tokens missing to reach $CBS^i$ and $EBS^i$ in the green and yellow buckets of CoS i, respectively, at time $t_j$.

$B^i_c(t_j)$ and $B^i_e(t_j)$ denote the number of tokens in the green and yellow token buckets of CoS i, respectively, at a given time $t_j$, where $B^i_c(t_0)=CBS^i$ and $B^i_e(t_0)=EBS^i$.

$O_c(t_j)$ denotes the total number of overflow tokens left in the EGTS after token sharing is performed to the green token buckets at a give time $t_j$. These tokens may be sent to EYTS if the global coupling flag CF=1. Otherwise, these tokens are discarded.

$SF^i$ denotes the per-CoS sharing flag. When $SF^i=0$, CoS i is precluded from sharing tokens with other CoS levels.

$X(t_j)$ denotes the number of tokens in the EGTS at time $t_j$ before the tokens are distributed. $X(t_j)$ can be distributed in a strict-priority order based on the equation for $f^i_c(t)$ for i=1 to n. Other distribute schemes, as described later in this section, are also possible.

$Y(t_j)$ denotes the number of tokens in the EYTS at time $t_j$ before the tokens are distributed. $Y(t_j)$ can be distributed in a strict-priority order based on the equation for $f^i_e(t)$ for i=1 to n. Other distribute schemes, as described later in this section, are also possible.

In the representation illustrated in FIG. 6, on the green token side, the number of overflow tokens in the green token bucket for CoS i is:

$$O^i_c(t_j) = \max\left\{0, B^i_c(t_{j-1}) + \frac{CIR^i}{8} \times (t_j - t_{j-1}) - CBS^i\right\}, \quad i=1 \text{ to } n$$

which means that the overflow tokens are determined based on the number of tokens in the bucket at time $t_{j-1}$, the green token injection rate $CIR^i$, and the assigned token bucket size $CBS^i$ for CoS i. The available space in the green bucket for CoS i can be expressed as:

$$D^i_c(t_j) = CBS^i - \min\left\{CBS^i, B^i_c(t_{j-1}) + \frac{CIR^i}{8} \times (t_j - t_{j-1})\right\}. \quad i=1 \text{ to } n$$

The total number of overflow tokens (corresponding to the green tokens) available to the EGTS is:

$$X(t_j) = \sum_{k=1}^{n} (SF^k \times O^k_c(t_j)).$$

Note that for a particular CoS k, $O^k_c(t_j)$ only contributes to $X(t_j)$ if $SF^k=1$.

Equation group (1) below defines how the EGTS shares the overflow green tokens, represented in terms of overflow tokens, using a strict-priority distribution algorithm:

$$f^i_c(t_j) = \min\left\{\frac{CIR^i_{max} - CIR^i}{8} \times (t_j - t_{j-1}), F^i_c(t_j)\right\}, f^0_c(t_j) = 0 \quad (1)$$
$$i=1 \text{ to } n$$

$$F^i_c(t_j) = \quad i=1 \text{ to } n$$
$$D^i_c(t_j) - \max\left\{0, \min\left\{D^i_c(t_j), D^i_c(t_j) + \left[\sum_{k=0}^{i-1} f^k_c(t_j)\right] - SF^i \times X(t_j)\right\}\right\}$$

$$B^i_c(t_j) = CBS^i - D^i_c(t_j) + f^i_c(t_j)$$
$$i=1 \text{ to } n$$

Equation group (1) computes the number of tokens in the green token bucket for each CoS after distribution of overflow green tokens based on a strict-priority order. $f^i_c(t_j)$ denotes the number of overflow green tokens distributed to the green token bucket for CoS i. The first two expressions ensure that the overflow green tokens are given to the highest CoS (starting from CoS 1) first, and each CoS i receives the overflow green tokens until its $CBS^i$ and $CIR^i_{max}$ are reached or the available overflow green tokens are depleted, so long as the corresponding sharing flag $SF^i=1$. No excess green tokens will be distributed to a CoS i for which $SF^i=0$.

Note that the term $CIR_{max}^i - CIR^i$ represents the maximum additional CIR rate that can be distributed to CoS i. Other notations can also be used to represent the same value. For example, notation $CIR^i_{dist\_max}$ can denote the equivalent of $CIR_{max}^i - CIR^i$. Similarly, for yellow tokens, notation $EIR^i_{dist\_max}$ can denote $EIR_{max}^i - EIR^i$. These different notions can also be used in the equations presented in subsequent figures.

On the yellow token side, the number of overflow tokens in the yellow token bucket for CoS i is:

$$O^i_e(t_j) = \max\left\{0, B^i_e(t_{j-1}) + \frac{EIR^i}{8} \times (t_j - t_{j-1}) - EBS^i\right\},$$
$$i=1 \text{ to } n$$

which means that the overflow tokens are determined based on the number of tokens in the bucket at time $t_{j-1}$, the yellow token injection rate $EIR^i$, and the assigned excess bucket size $EBS^i$ for CoS i.

The available space in the yellow bucket for CoS i can be expressed as:

$$D^i_e(t_j) = \quad i=1 \text{ to } n$$
$$EBS^i - \min\left\{EBS^i, B^i_e(t_{j-1}) + \frac{EIR^i}{8} \times (t_j - t_{j-1}) + CF^i \times \overline{SF^i} \times O^i_c(t_j)\right\}.$$

Note that the additional term $CF^i \times \overline{SF^i} \times O^i_c(t_j)$ accounts for the situation where the overflow green token from the same CoS level are directly converted to yellow tokens without any sharing with other green token buckets when the CoS-specific sharing flag $SF^i=0$ and the CoS-specific coupling flag $CF^i=1$. The total number of overflow bytes (corresponding to the yellow tokens) available to the EYTS is:

$$Y(t_j) = \sum_{k=1}^{n} (SF^k \times O^k_e(t_j)) + CF \times O_c(t_j).$$

Note that the term $CF \times O_c(t_j)$ accounts for the global coupling flag CF and the total overflow bytes $O_c(t_j)$ left in the EGTS after token sharing is performed. Equation group (2) below defines how the EYTS shares the overflow yellow tokens using a strict-priority distribution algorithm:

$$f_e^i(t_j) = \min\left\{\frac{EIR_{max}^{-i} - EIR^i}{8} \times (t_j - t_{j-1}), f_e^i(t_j)\right\}, f_e^0(t_j) = 0 \quad (2)$$
$$\scriptstyle i=1 \text{ to } n$$

$$F_e^i(t_j) =$$
$$\scriptstyle i=1 \text{ to } n$$

$$D_e^i(t_j) - \max\left\{0, \min\left\{D_e^i(t_j), D_e^i(t_j) + \left[\sum_{k=0}^{i-1} f_e^k(t_j)\right] - SF^i \times Y(t_j)\right\}\right\}$$

$$B_e^i(t_j) = EBS^i - D_e^i(t_j) + f_e^i(t_j)$$
$$\scriptstyle i=1 \text{ to } n$$

Equation group (2) computes the number of tokens in the yellow token bucket for each CoS after strict-priority-based distribution of overflow and converted yellow tokens. $f_e^i(t_j)$ denotes the number of excess yellow tokens distributed to the yellow token bucket for CoS i. The first two expressions ensure that the excess yellow tokens are given to the highest CoS (starting from CoS 1) first, and each CoS i receives the excess yellow tokens until its $EBS^i$ and $EIR^i_{max}$ are reached or the available excess yellow tokens are depleted, so long as the corresponding sharing flag $SF^i=1$. No excess yellow tokens will be distributed to a CoS i for which $SF^i=0$.

After the green and yellow token re-distribution is complete, the system then determines how to mark the incoming frame based on its bandwidth-profile compliance. The system first determines whether it is operating in a color-blind mode or whether the incoming frame is already marked green. If either condition is true, and if the green bucket at CoS p has sufficient number of tokens to transmit the incoming frame (i.e., $l_j \leq B_c^p(t_j)$ (operation 602), the system marks the frame green and reduce the number of green tokens corresponding to the frame's length in the green token bucket of CoS P (operation 603).

Otherwise, the system then determines whether it is in color-blind mode or whether the frame is marked with any color other than red (operation 604). If either condition is true, and if the yellow bucket at CoS p has sufficient number of tokens to transmit the incoming frame (i.e., $l_j \leq B_e^p(t_j)$) (operation 604), the system marks the frame yellow and reduce the number of yellow tokens corresponding to the frame's length in the yellow token bucket of CoS P (operation 605). Otherwise, the system marks the frame red.

Figure 7:
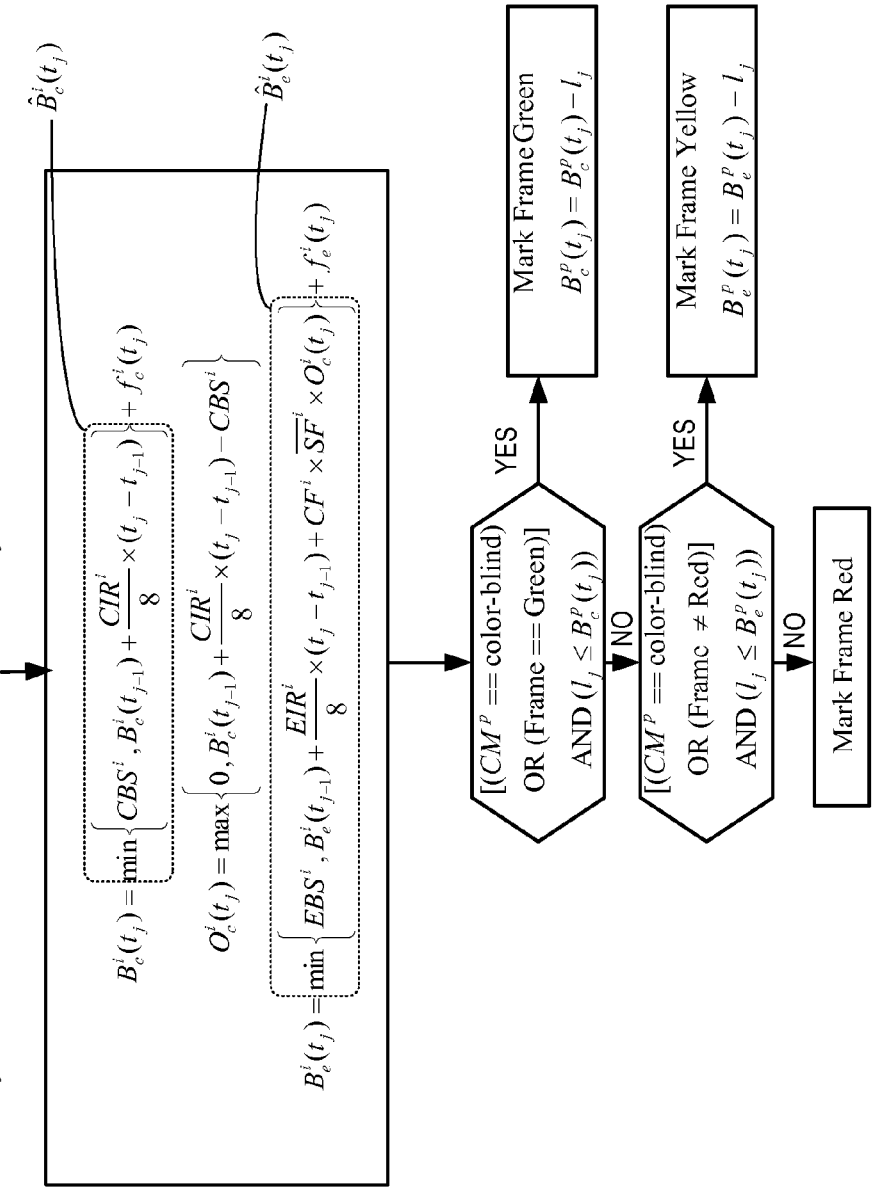

The algorithm depicted in FIG. 6 can be equivalently depicted in two parts as illustrated in FIG. 7 and FIG. 8. In FIG. 7, the expression $$B_c^i(t_j) = \min\left\{CBS^i, B_c^i(t_{j-1}) + \frac{CIR^i}{8} \times (t_j - t_{j-1})\right\} + f_c^i(t_j)$$

indicates that the number of green tokens in CoS i depends on the number of green tokens as distributed normally based on $CIR^i$ and the number of overflow green tokens re-distributed from other CoS levels, denoted by $f_c^i(t_j)$.

The expression $$B_e^i(t_j) =$$
$$\min\left\{EBS^i, B_e^i(t_{j-1}) + \frac{EIR^i}{8} \times (t_j - t_{j-1}) + CF^i \times \overline{SF^i} \times O_c^i(t_j)\right\} + f_e^i(t_j)$$

indicates that the number of yellow tokens in CoS i depends on the number of yellow tokens as distributed normally based on $EIR^i$, the number of yellow tokens converted from the overflow green tokens from the same CoS level, and the number of overflow yellow tokens re-distributed from other CoS levels, denoted by $f_e^i(t_j)$.

In FIG. 8, the top half presents the equation group for strict-priority-based distribution of overflow green tokens, and the bottom half presents the equation group for strict-priority-based distribution of overflow yellow tokens. Note that the notations $\hat{B}_c^i(t_j)$ and $\hat{B}_e^i(t_j)$ denote portions of the expression for $B_c^i(t_j)$ and $B_e^i(t_j)$ in FIG. 7, respectively.

Directional Sharing and Coupling

In some embodiments, the strict-priority-based token sharing can be enhanced with directionality with respect to sharing and coupling. In other words, because the EGTS and EYTS retain the CoS information of overflow tokens, the system can implement CoS-specific sharing and/or coupling policies. For example, the system can preclude a lower CoS level from sharing its overflow tokens with CoS levels of higher priority, and/or preclude the yellow tokens converted from the overflow green tokens from a respective CoS level from being shared with CoS levels of higher priority. FIG. 7 and FIG. 9 jointly illustrate the two parts of equations for directional sharing and non-directional coupling. The expressions illustrated in FIG. 7 is common to both directional sharing and non-directional sharing (which is illustrated in FIG. 8).

Compared with the expression for green tokens in FIG. 8, the expression for green tokens available for distribution is CoS-specific and depends on the destination of sharing. Recall that in FIG. 8 this number is the same for all CoS levels and is expressed as $$X(t_j) = \sum_{k=1}^{n} (SF^k \times O_c^k(t_j)).$$

In the example illustrated in FIG. 9, however, the number of overflow green tokens is computed for each CoS level. In other words, the overflow green tokens available for distribution to a given CoS i+1 are collected from only those CoS levels of higher priority, i.e., CoS 1 to CoS i (recall that this disclosure assumes that a lower CoS index indicates a CoS level of higher priority). Hence, the expression $$X^i(t_j) = \sum_{k=0}^{i} (SF^k \times O_c^k(t_j))$$

indicates the number of overflow green tokens available for distribution to CoS i+1, from all other CoS levels of higher priority.

In addition, compared with the expression for $f_c^i(t_j)$ in FIG. 8, which denotes the number of green tokens distributed to CoS i in strict-priority order, the corresponding expression in FIG. 9 is:

$$f_c^i(t_j) = \min\left\{\frac{CIR_{max}^i - CIR^i}{8} \times (t_j - t_{j-1}), SF^i \times D_c^i(t_j), X^{i-1}(t_j) - \left[\sum_{k=0}^{i-1} f_c^k(t_j)\right]\right\}.$$

This expression includes the term $X^{i-1}(t_j)$, which accounts for all the overflow green tokens from CoS levels of higher priority than CoS i and facilitates the directional sharing.

Similarly, the number of yellow tokens available for distribution to CoS i+1 is expressed as $$Y^i(t_j) = \sum_{k=0}^{i}(SF^k \times O_e^k(t_j)) + CF \times O_c(t_j).$$

The number of yellow tokens distributed to CoS i in strict-priority order is expressed as:

$$f_e^i(t_j) = \min\left\{\frac{EIR_{max}^i - EIR^i}{8} \times (t_j - t_{j-1}), SF^i \times D_e^i(t_j), Y^{i-1}(t_j) - \left[\sum_{k=0}^{i-1} f_e^k(t_j)\right]\right\}.$$

The term $Y^{i-1}(t_j)$ accounts for all the overflow yellow tokens from CoS levels of higher priority than CoS i and facilitates the directional sharing.

FIG. 10A illustrates the equation groups for directional sharing and directional coupling, in accordance with one embodiment of the present invention. The portion of the equations with respective to directional sharing, namely $X^i(t_j)$ and $Y^i(t_j)$, are similar to those illustrated in FIG. 9. The difference between FIG. 10 and FIG. 9 is that, in the directional coupling illustrated in FIG. 10, the unused green tokens to be used as yellow tokens by CoS i+1 is expressed as $$Z_c^i(t_j) = \max\left\{0, X^i(t_j) - \sum_{k=1}^{n} f_c^k(t_j)\right\}.$$

This expression accounts for all the unused overflow green tokens from CoS 1 to CoS i after the directional sharing, and facilitates directional coupling.

Correspondingly, the number of yellow tokens available from CoS 1 to CoS i for distribution is expressed as:

$$Y^i(t_j) = \sum_{k=0}^{i} [SF^k \times O_e^k(t_j)] + CF \times Z_c^{i+1}(t_j).$$

In the example illustrated in FIG. 10A, the directional coupling uses a top-down approach, where overflow green tokens from CoS j are distributed to needing lower-priority $CoS_i$ (i>j) before overflow green tokens from a lower-priority CoS k (k>j) are distributed. In other words, overflow green tokens from higher-priority CoSs are distributed (i.e., consumed) first. This top-down approach is defined by the equation $$Z_c^i(t_j) = \max\left\{0, X^i(t_j) - \sum_{k=1}^{n} f_c^k(t_j)\right\}.$$

In one embodiment, the directional coupling can use a bottom-up approach, as illustrated in FIG. 10B. With the bottom-up approach, overflow green tokens from a CoS j are distributed to needing lower-priority CoSs ($CoS_i$, i>j) after overflow green tokens from a lower-priority $CoS_k$ (k>j) have been distributed. In other words, overflow green tokens from higher priority CoSs are distributed (i.e., consumed) last. This bottom-up approach is defined by the equation $$Z_c^i(t_j) = \min\left\{X^i(t_j), X^n(t_j) - \sum_{k=1}^{n} f_c^k(t_j)\right\}$$

(see the last equation in the "committed token equations" in FIG. 10B).

In the above examples illustrated in FIGS. 10A and 10B, the directional coupling in all the CoSs is controlled by a common parameter (coupling flag), CF. When CF=1, overflow green tokens from a CoS which are not used by a lower-priority CoS are converted to yellow tokens of the same CoS. In a further embodiment, the directional coupling for each CoS can be controlled by the CoS-specific coupling flag, $CF^i$. Correspondingly, the yellow tokens available for distribution on CoS i is $$Y^i(t_j) = \sum_{k=0}^{i} [SF^k \times O_e^k(t_j)] + CF^i \times Z_c^{i+1}(t_j)$$

(note that $CF^i$ is used instead of CF), as illustrated in FIG. 10C.

Figure 10D:
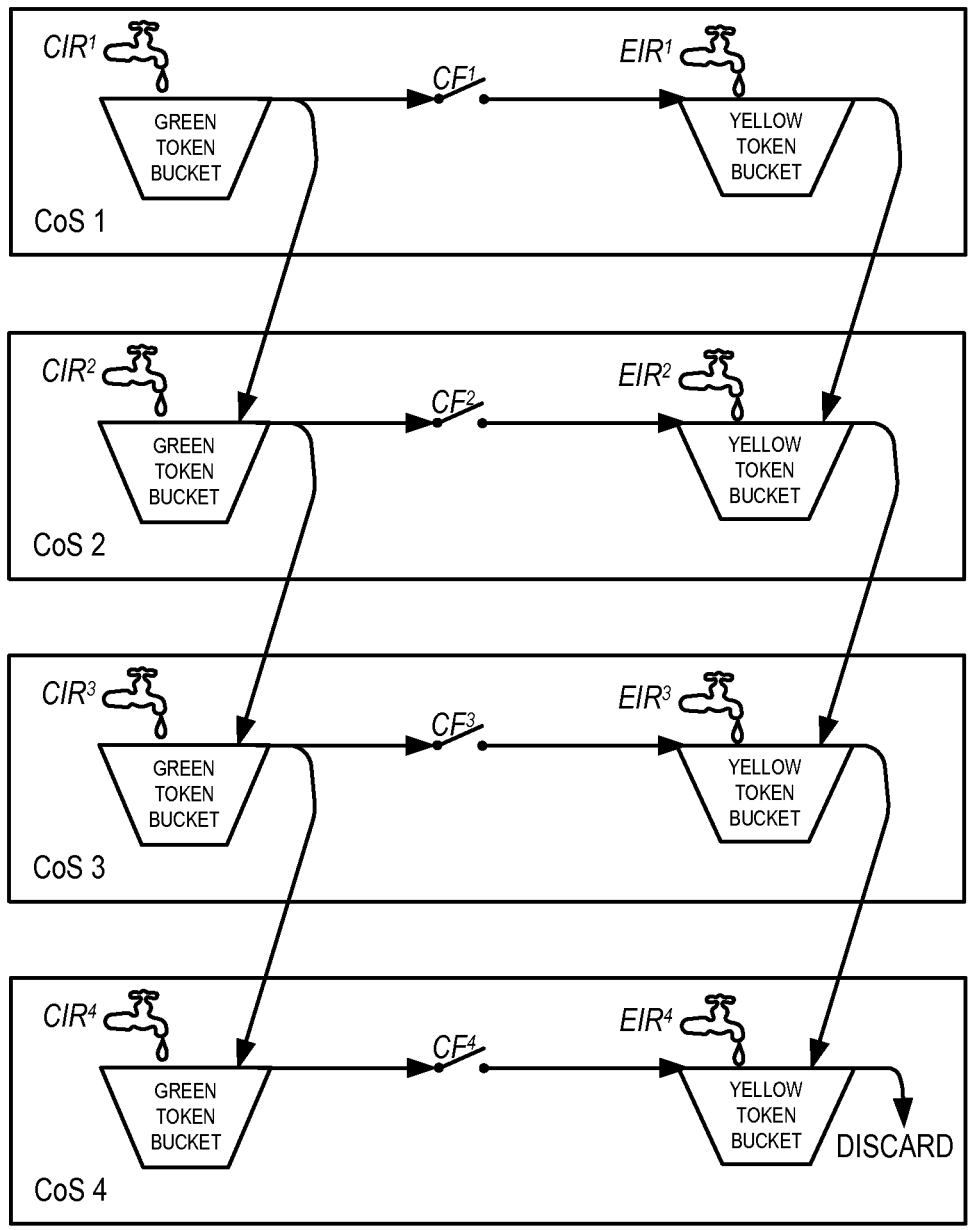
FIG. 10D presents a diagram illustrating the operation of CoS-specific coupling flag $CF^i$, in accordance with one embodiment of the present invention.

FIG. 10D presents a diagram illustrating CoS-specific control of directional coupling. In this example, the overflow green tokens from each CoS's green token bucket are first shared with lower-priority CoSs (assuming that all $SF^i=1$). Then, whether the additional green tokens from a respective $CoS_i$ is converted to corresponding yellow tokens is controlled by $CF^i$. For example, if $CF^1=0$, $CF^2=0$, $CF^3=0$, and $CF^4=1$, only the overflow green tokens on CoS 4 can be converted to yellow tokens.

Figure 10E:
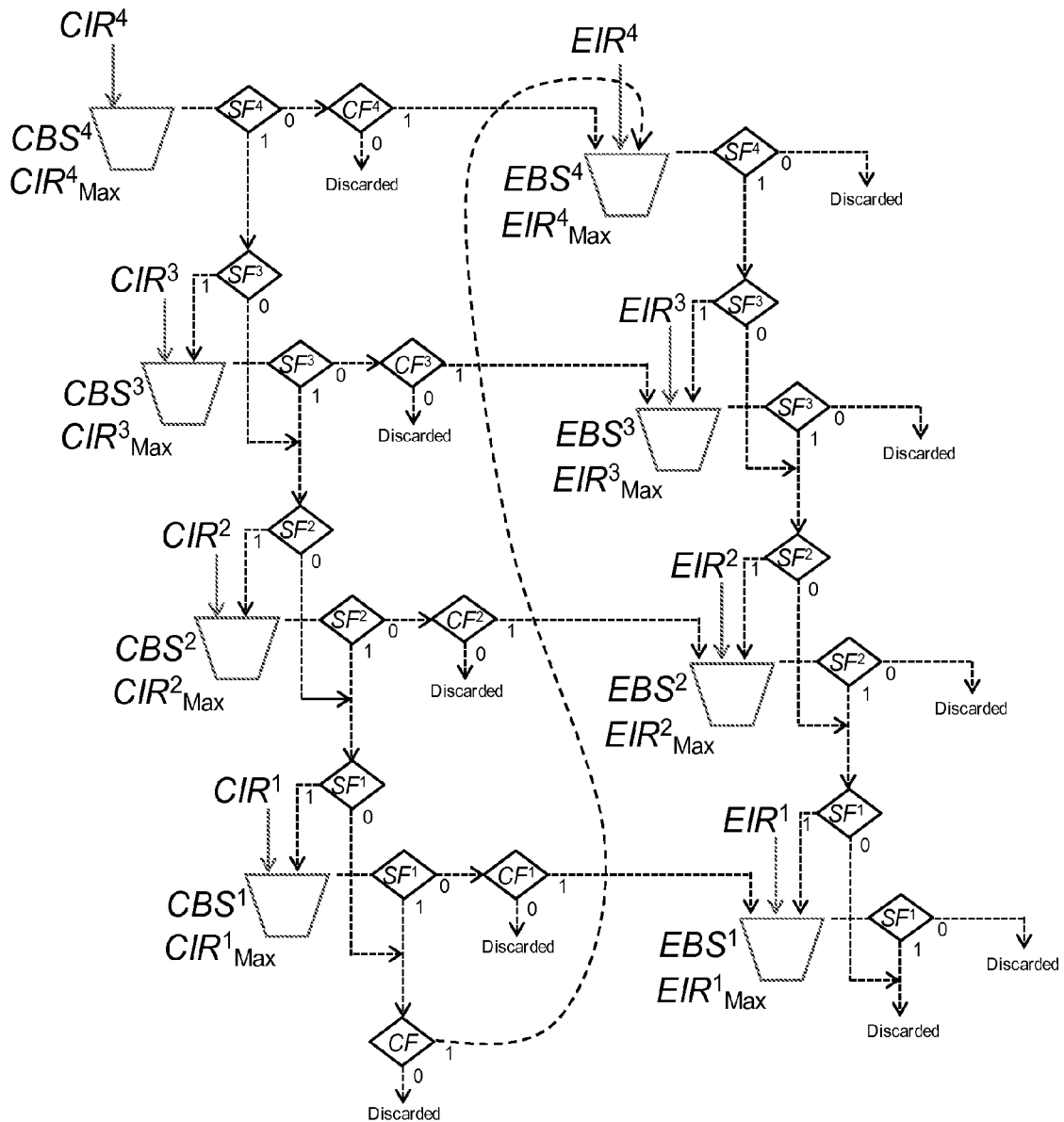
FIG. 10E presents a diagram illustrating the token flow in a directional sharing coupling scheme, in accordance with one embodiment of the present invention.

In the examples above, after sharing and coupling, the overflow green token are then converted to yellow tokens and distributed to the yellow token buckets, starting from the highest-priority CoS. This is illustrated in FIG. 10E. The conversion of "leftover" green tokens is controlled by the global coupling flag CF. Note that in FIG. 10E, a different CoS priority designation is used. CoS 4 has the highest priority, and CoS 1 has the lowest priority. This different designation illustrate that embodiments of the present invention are not limited to a particular CoS designation. Furthermore, the sharing flag at each CoS controls both the receiving of shared overflow tokens from the immediate higher-priority CoS and the sharing of overflow tokens to the immediate lower-priority CoS. For example, for CoS 3, $SF^3$ determines whether the green token bucket can receive shared green tokens from CoS 4, as well as whether the overflow green tokens can be distributed to the green token bucket of CoS 2. In addition, the example in FIG. 10E would not be considered as directional coupling, because the "leftover" green tokens at CoS 1 after all sharing and conversion are converted and distributed to the yellow token bucket of CoS 4.

Figure 10F:
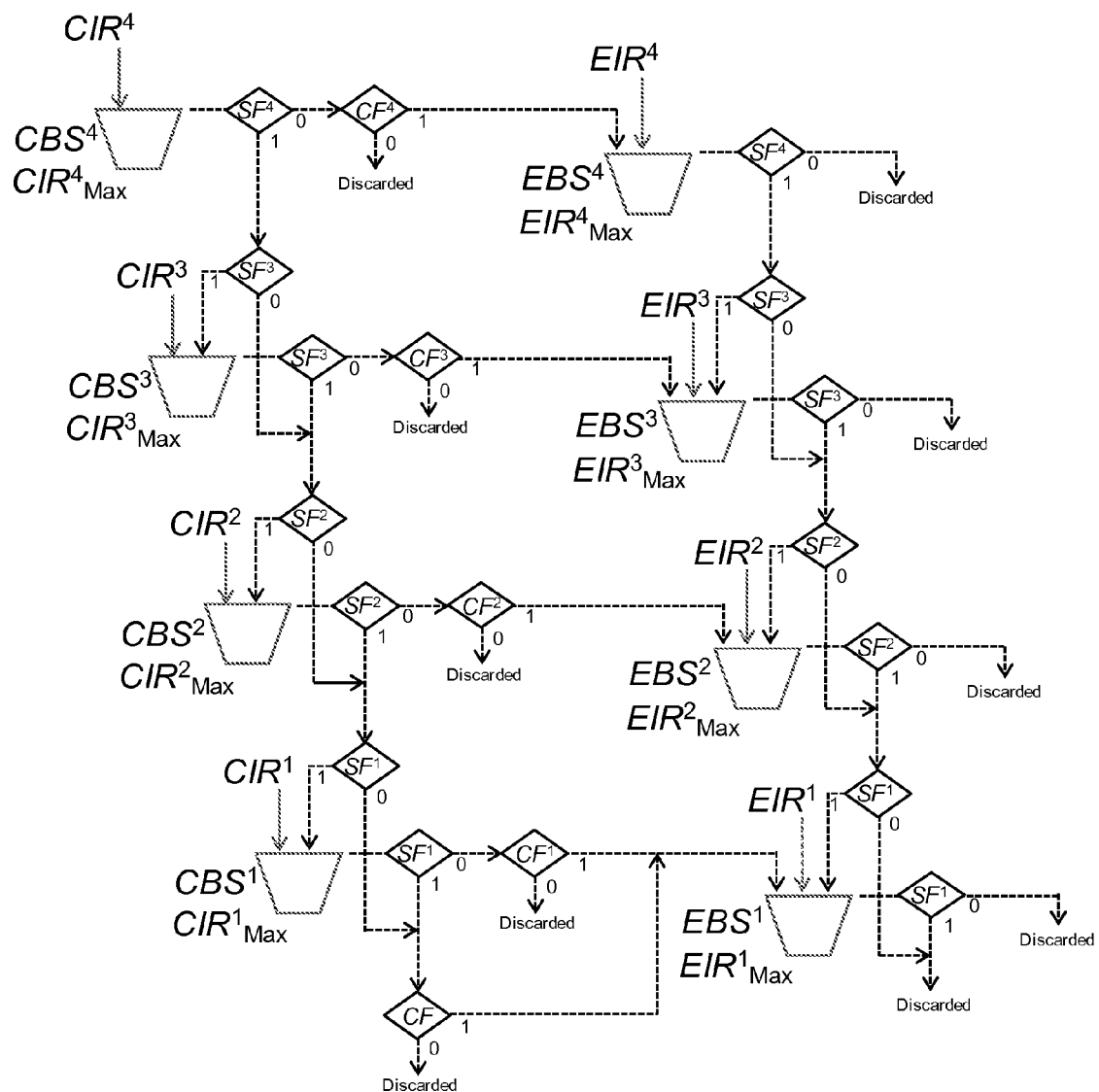
FIG. 10F presents a diagram illustrating the token flow in an alternative directional sharing and directional coupling scheme, in accordance with one embodiment of the present invention.
Figure 10G:
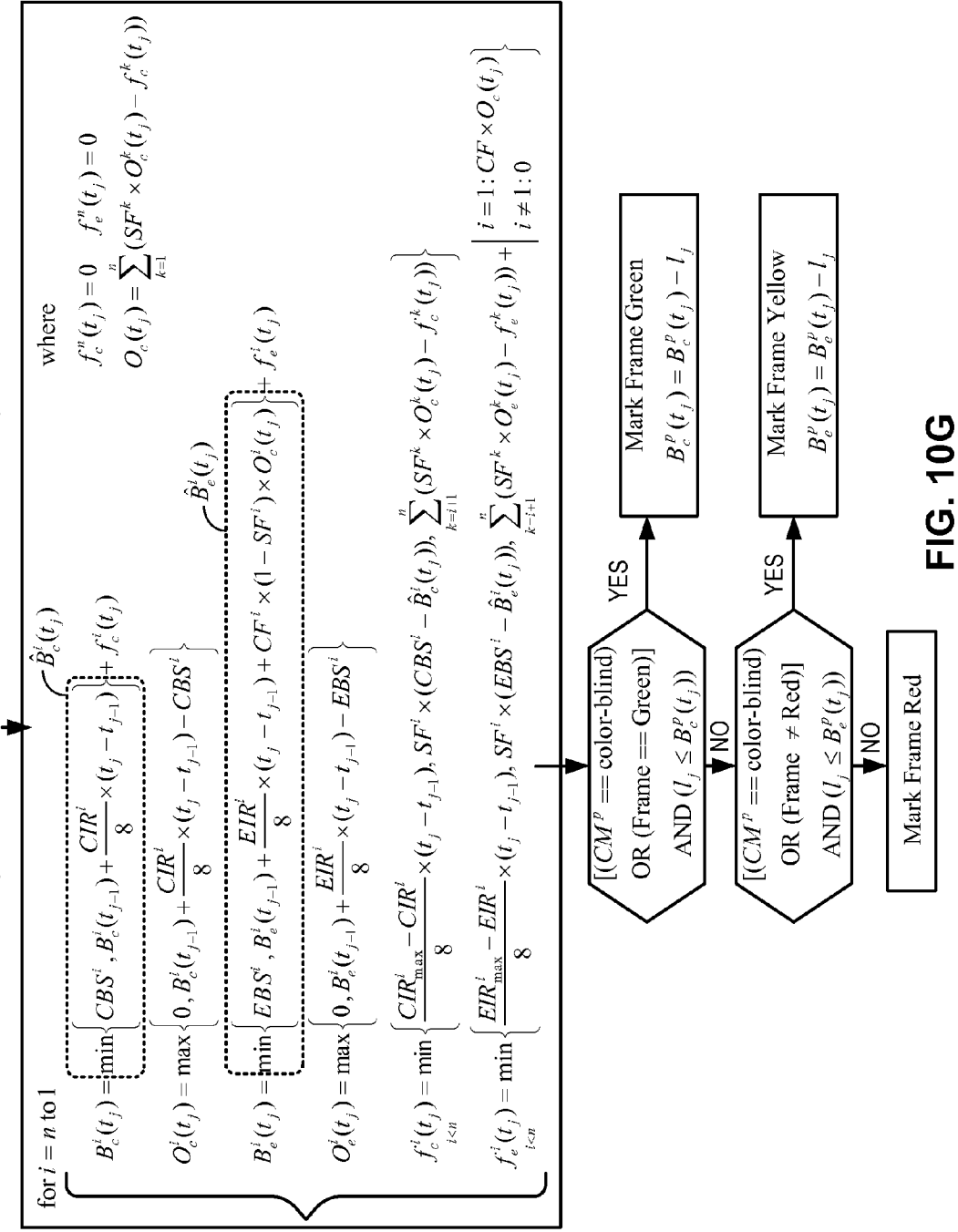
FIG. 10G presents the mathematical representation of the overflow token conversion approach illustrated in FIG. 10F, in accordance with one embodiment of the present invention.

In one embodiment, the distribution of converted yellow tokens after directional sharing and coupling is limited to the yellow token bucket of the lowest CoS. FIG. 10F illustrates how the sharing and coupling flags operate to facilitate this "bottom only" token conversion approach. In this example, at the bottom of FIG. 10F, CF controls whether, when $SF^1=1$, the overflow green tokens can be converted to yellow tokens and be distributed to the yellow token bucket in CoS 1. The mathematical formulation of the approach illustrated in FIG. 10F is presented in FIG. 10G (the notations used are similar to those in FIG. 6). Note that in FIG. 10G $(1-SF^i)$ is used to denote the complement of $SF^i$, whereas $\overline{SF^i}$ is used in FIG. 6. Both expressions can be used interchangeably.

Weighted Distribution of Overflow Tokens

Unlike token distribution in a strict-priority order, a weighted distribution algorithm distributes overflow tokens to different CoS levels based on a predefined weight associated with each CoS. Thus, when a weighted token distribution is enabled, each CoS i within the VC is configured with a weight value $W^i$, and the overflow tokens are distributed to each CoS i proportional to $W^i$. When all classes of service within the VC are assigned the same weight values $W^i$, the system performs Round Robin distribution, which is as a special case of weighted distribution.

Now assume an example where $W_c^1 = W_c^2 = W_c^3 = 1$ and where the green token bucket for CoS 2 is full. In this case, the EGTS will distribute overflow green tokens in a weighted Round Robin (WRR) order. The first step is to distribute overflow green tokens to CoS 1 according to the defined weights. Since CoS 2 has a full green token bucket, it will not participate in the distribution. Since CoS 1 and CoS 3 have the same weights, they will receive equal number of the available overflow green tokens. Therefore, CoS 1 and CoS 3 each receive half of the available overflow green tokens.

If, for example, the weights were $W_c^1 = W_c^2 = 1$ and $W_c^3 = 2$, CoS 1 would receive one third (⅓) of the available overflow green tokens and CoS 3 would receive two thirds (⅔) of the available overflow green tokens. This is the case because the weight assigned to CoS 3 is twice the one assigned to CoS 1. Note that CoS 1 and CoS 3 are able to accommodate the distributed overflow green tokens because there is sufficient space in their respective green token buckets and their assigned $CIR_{max}^1$ and $CIR_{max}^3$ rates are not exceeded. If $CIR_{max}^3$ were exceeded, CoS 3 would not be able to accommodate its WRR share of the available green tokens and some tokens would be left in the EGTS for further distribution. The EGTS would then need to run another round of distribution (starting again from CoS 1) to distribute those remaining overflow green tokens.

In general terms, WRR distribution requires the EGTS to keep trying to distribute remaining overflow green tokens until there is no CoS level eligible for distribution. In the worst case, the EGTS may need to run up to n distribution rounds to finish, where n is the total number of CoS levels. A CoS i is eligible for distribution when its green token bucket is not full and its $CIR_{max}^i$ rate is not exceeded by adding additional green tokens into its green token bucket.

After all the overflow green tokens are distributed by the EGTS, any remaining green tokens can be converted to yellow tokens and given to the EYTS, if the VC coupling flag (CF) is set to 1. Overflow yellow tokens are then distributed to the CoS levels in a manner similar to the one described for overflow green tokens.

Figure 11A:
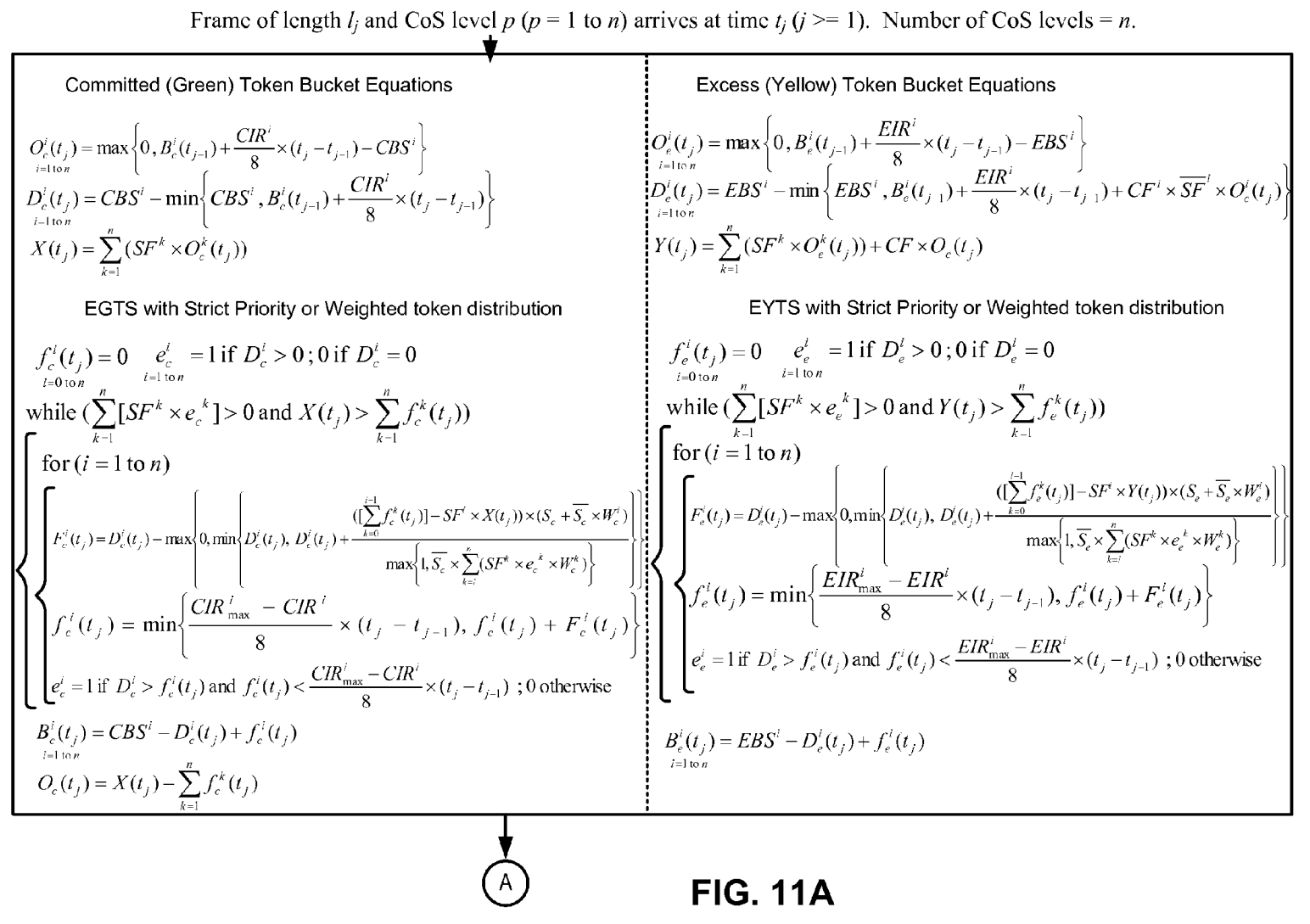
Figure 11B:
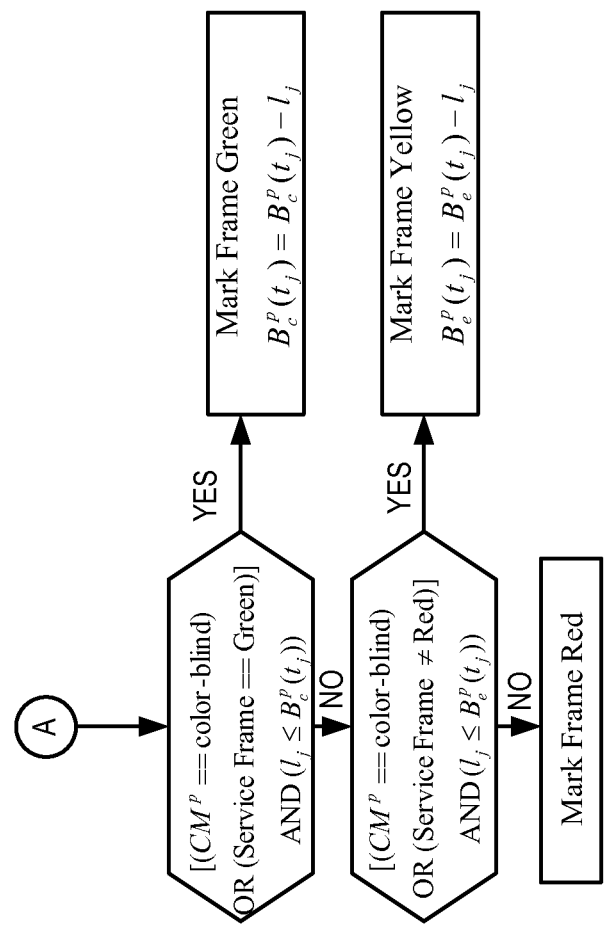

FIG. 11A and FIG. 11B jointly illustrate the operation of EGTS and EYTS with weighted distribution of overflow tokens, in accordance with one embodiment of the present invention. The algorithm described in FIGS. 11A and 11B is compatible with the strict-priority distribution with non-directional sharing and non-directional coupling discussed in the previous section. For example, strict-priority distribution of green tokens can be enabled by setting $S_c$ to 1. WRR distribution of green tokens is enabled when $S_c=0$ and each CoS i within the VC is configured with a weight value $W_c^i$. RR distribution of green tokens can be implemented by assigning all CoS levels with the same weight values.

On the green token side, the distribution is performed n times (as indicated by the "for (i=1 to n)" loop statement), as explained above, to ensure that when a CoS level's green bucket is full, the remaining excess green tokens are re-distributed again to the other buckets, until all the excess green tokens are used or all the buckets are full.

$F_c^i(t_j)$ represents the number of overflow green tokens that can be given to CoS i as determined by the algorithm and the available space of the green token bucket of CoS i, and is expressed as:

$$F_c^i(t_j) = D_c^i(t_j) - \max\left\{0, \min\left\{D_c^i(t_j), D_c^i(t_j) + \frac{\left(\left[\sum_{k=0}^{i-1} f_c^k(t_j)\right] - SF^i \times X(t_j)\right) \times (S_c + \overline{S_c} \times W_c^i)}{\max\left\{1, \overline{S_c} \times \sum_{k=i}^{n} (SF^k \times e_c^k \times W_c^k)\right\}}\right\}\right\}$$

The term $$\frac{\left(\left[\sum_{k=0}^{i-1} f_c^k(t_j)\right] - SF^i \times X(t_j)\right) \times (S_c + \overline{S_c} \times W_c^i)}{\max\left\{1, \overline{S_c} \times \sum_{k=i}^{n} (SF^k \times e_c^k \times W_c^k)\right\}}$$

facilitates either strict-priority distribution or WRR distribution, depending on the value of $S_c$.

The equation calculating $f_c^i(t_j)$ limits the amount of green tokens distributed to CoS i given its corresponding $CIR_{max}^i$. The value $e_c^i$ defines the eligibility of CoS i to receive overflow green token distribution. The initial eligibility of each CoS level is calculated before the first distribution and is recalculated after each iteration of the "for" loop, i.e., the "for (i=1 to n)" statement. The "while" loop is used in the WRR algorithm to allow the EGTS to distribute the remaining overflow green tokens after a "for" loop.

The distribution functionality of the EYTS is similar to the one of the EGTS. The equations used by the EGTS and EYTS only differ on the subscripts "c" and "e." For example, the equation describing $F_c^i(t_j)$ used by the EGTS is similar to the one describing $F_e^i(t_j)$ used by the EYTS.

The embodiments described above use a single flag $SF^i$ to define whether CoS i is allowed to send its overflow green tokens to the EGTS, receive distributed green tokens from the EGTS, send overflow yellow tokens to the EYTS, and receive distributed yellow tokens from the EYTS.

Figure 12:
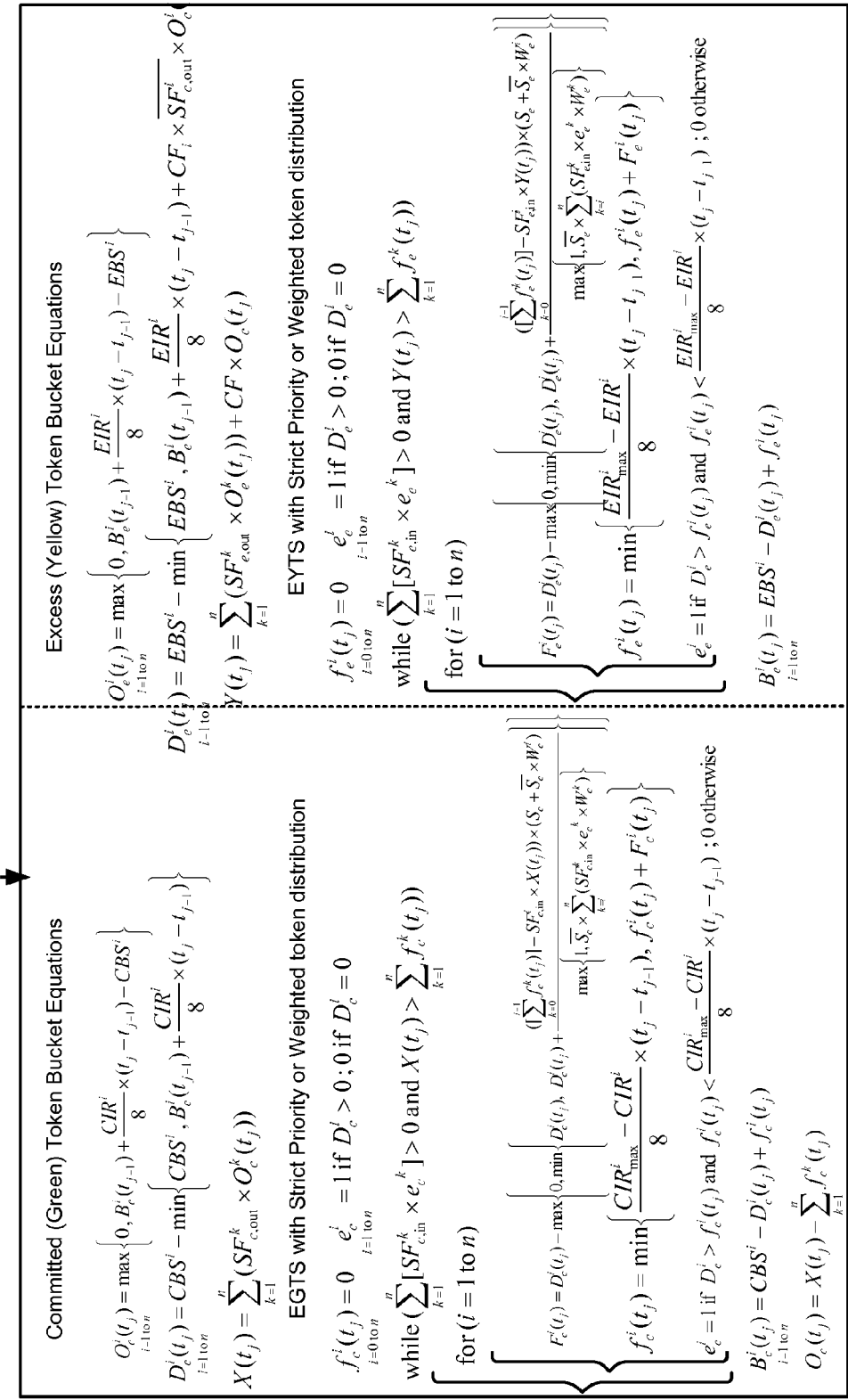
FIG. 12 presents the mathematical representation of a token sharing mechanism that facilitates weighted distribution of overflow tokens with CoS-specific, sharing-direction-specific sharing flags, in accordance with one embodiment of the present invention.

In some embodiments, each of these functions is controlled by a separate flag, as illustrated in FIG. 12. Specifically, the following sharing flags are defined and used in the equations:

$SF_{c,out}^{i}$, where $SF_{c,out}^{i}=0$ or 1. When $SF_{c,out}^{i}$ is set to 0, CoS i does not send overflow green tokens to the EGTS. When $SF_{c,out}^{i}$ is set to 1, CoS i sends overflow green tokens to the EGTS.

$SF_{c,in}^{i}$, where $SF_{c,in}^{i}=0$ or 1. When $SF_{c,in}^{i}$ is set to 0, CoS i does not receive the distribution of green tokens from the EGTS. When $SF_{c,in}^{i}$ is set to 1, CoS i receives the distribution of green tokens from the EGTS.

$SF_{e,out}^{i}$, where $SF_{e,out}^{i}=0$ or 1. When $SF_{e,out}^{i}$ is set to 0, CoS i does not send overflow yellow tokens to the EYTS. In this case, overflow yellow tokens are discarded. When $SF_{e,out}^{i}$ is set to 1, CoS i sends overflow yellow tokens to the EYTS.

$SF_{e,in}^{i}$, where $SF_{e,in}^{i}=0$ or 1. When set to 0, CoS i does not receive the distribution of yellow tokens from the EYTS. When set to 1, CoS i receives the distribution of yellow tokens from the EYTS.

Exemplary System Architecture

Figure 13:
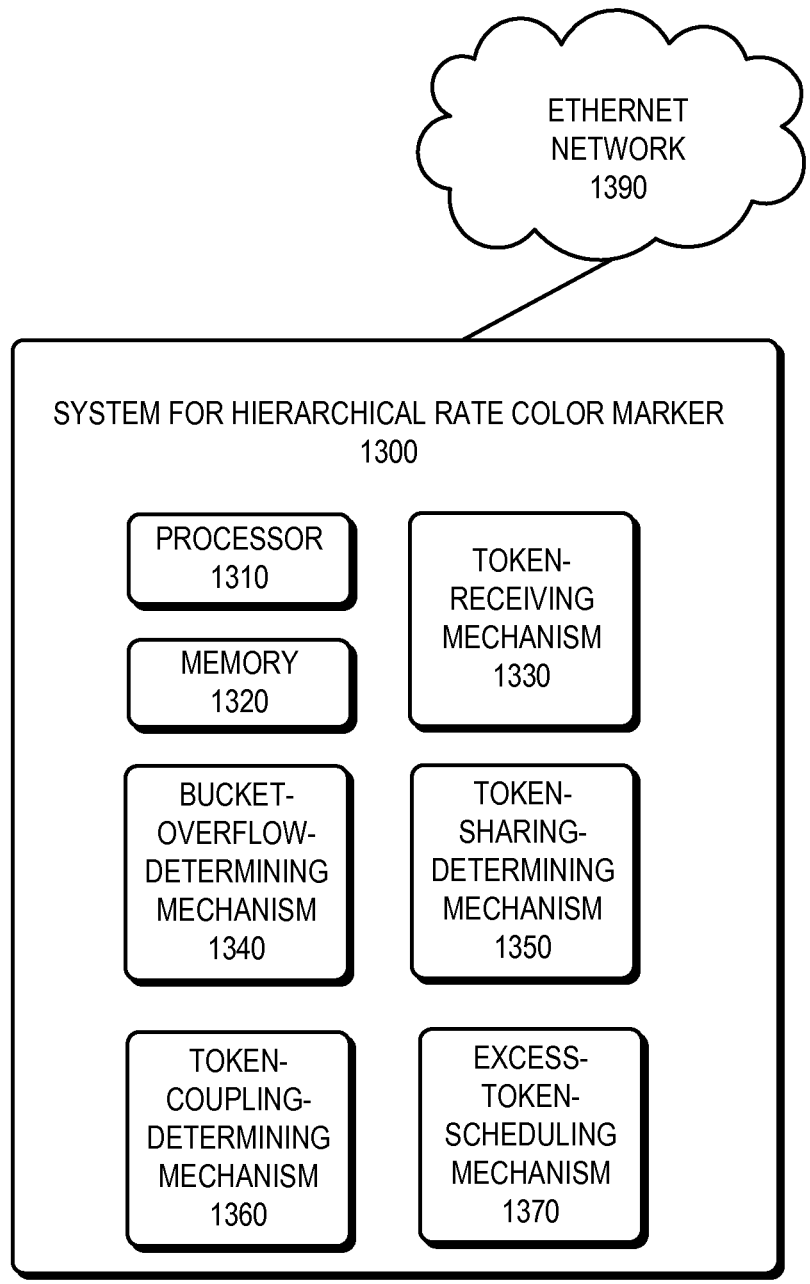
FIG. 13 presents a block diagram illustrating a hierarchical rate color system in accordance with an embodiment of the present invention.

FIG. 13 presents a block diagram illustrating a hierarchical rate color system in accordance with an embodiment. System 1300 includes a processor 1310, a memory 1320, a token-receiving mechanism 1330, a bucket-overflow-determining mechanism 1340, a token-sharing-determining mechanism 1350, a token-coupling-determining mechanism 1360, and an excess-token-scheduling mechanism 1370. System 1300 is coupled to an Ethernet network 1390. Token-receiving mechanism 1330 receives green or yellow tokens at a CIR or EIR rate. Bucket-overflow-determining mechanism 1340 determines whether an unused token causes a given bucket to overflow. Token-sharing-determining mechanism 1350 determines whether token sharing is permitted based on the value of a sharing flag. Token-coupling-determining mechanism determines whether token coupling is permitted based on the value of a coupling flag. Excess-token-scheduling mechanism 1370 distributes overflowing unused tokens from a given bucket to another token bucket according to embodiments of the hierarchical token color marker algorithm disclosed herein.

Although this detailed description discloses the Ethernet Virtual Connection, embodiments of the present invention apply to other types of VCs as well, for example, and without limitation, Internet Protocol VCs, MPLS VCs, or Layer 3 VCs.

The above description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A system comprising:
   a packet processing hardware module operable to indicate a packet's compliance with a bandwidth profile based at least on available high-compliance tokens and medium-compliance tokens, wherein, the tokens are generated at regular time intervals and associated with packets to facilitate control of the packets' compliance with a bandwidth profile; and
   a distribution hardware module operable to convert, within different classes of service (CoS s), an overflow high-compliance token, prior to the high-compliance token being associated with a packet, to a medium-compliance token, in a top-down or bottom-up fashion with respect to different CoS priorities.

2. The system of claim 1, wherein whether a respective CoS priority level is allowed to share or precluded from sharing tokens with another CoS priority level is determined by a CoS-specific sharing flag.

3. The system of claim 1, wherein the distribution hardware module is further operable to preclude an overflow token from a respective CoS priority level from being distributed to a higher CoS priority level.

4. The system of claim 1, wherein whether an overflow high-compliance token from a respective CoS is allowed to be converted to a medium-compliance token is determined by a CoS-specific coupling flag.

5. The system of claim 1, wherein the number of overflow high-compliance tokens distributed to a respective CoS priority level is limited by an upper rate limit for high-compliance tokens for that CoS priority level.

6. The system of claim 1, wherein the number of overflow medium-compliance tokens distributed to a respective CoS priority level is limited by an upper rate limit for medium-compliance tokens for that CoS priority level.

7. The system of claim 1, wherein the distribution hardware module is operable to distribute overflow high-compliance or medium-compliance tokens to other CoS priority levels in a strict-priority order.

8. The system of claim 1, wherein the distribution hardware module is operable to distribute overflow high-compliance or medium-compliance tokens to other CoS priority levels based at least on a relative weight assigned to a respective CoS priority level.

9. A method comprising:
indicating a packet's compliance with a bandwidth profile based at least on available high-compliance tokens and medium-compliance tokens, wherein the tokens are generated at regular time intervals and associated with packets to facilitate control of the packets' compliance with a bandwidth profile; and
converting, within different classes of service (CoSs), an overflow high-compliance token, prior to the high-compliance token being associated with a packet, to a medium-compliance token, in a top-down or bottom-up fashion with respect to different CoS priorities.

10. The method of claim 9, further comprising determining whether a respective CoS priority level is allowed to share or precluded from sharing tokens with another CoS priority level based at least on a CoS-specific sharing flag.

11. The method of claim 9, further comprising precluding an overflow token from a respective CoS priority level from being distributed to a higher CoS priority level.

12. The method of claim 9, further comprising determining whether an overflow high-compliance token from a respective CoS is allowed to be converted to a medium-compliance token based on a CoS-specific coupling flag.

13. The method of claim 9, further comprising limiting the number of overflow high-compliance tokens distributed to a respective CoS level to an upper limit for high-compliance tokens for that CoS level.

14. The method of claim 9, further comprising limiting the number of overflow medium-compliance tokens distributed to a respective CoS level to an upper limit for medium-compliance tokens for that CoS level.

15. The method of claim 9, further comprising distributing overflow high-compliance or medium-compliance tokens to other CoS priority levels in a strict-priority order.

16. The method of claim 9, further comprising distributing overflow high-compliance or medium-compliance tokens to other CoS priority levels based at least on a relative weight assigned to a respective CoS level.

17. A non-transitory computer-readable storage medium storing instructions which when executed by a computer causes the computer to perform a method, the method comprising:
indicating a packet's compliance with a bandwidth profile based at least on available high-compliance tokens and medium-compliance tokens, wherein the tokens are generated at regular time intervals and associated with packets to facilitate control of the packets' compliance with a bandwidth profile; and
converting, within different classes of service (CoSs), an overflow high-compliance token, prior to the high-compliance token being associated with a packet, to a medium-compliance token, in a top-down or bottom-up fashion with respect to different CoS priorities.

18. The non-transitory computer-readable storage medium of claim 17, wherein the method further comprises determining whether a respective CoS priority level is allowed or precluded from sharing tokens with another CoS priority level based at least on a CoS-specific sharing flag.

19. The non-transitory computer-readable storage medium of claim 17, wherein the method further comprises precluding an overflow token from a respective CoS priority level from being distributed to a higher CoS priority level.

20. The non-transitory computer-readable storage medium of claim 17, wherein the method further comprises determining whether an overflow high-compliance token from a respective CoS is allowed to be converted to a medium-compliance token based on a CoS-specific coupling flag.

21. The non-transitory computer-readable storage medium of claim 17, wherein the method further comprises limiting the number of overflow high-compliance tokens distributed to a respective CoS priority level to an upper limit for high-compliance tokens for that CoS priority level.

22. The non-transitory computer-readable storage medium of claim 17, wherein the method further comprises limiting the number of overflow medium-compliance tokens distributed to a respective CoS priority level to an upper limit for medium-compliance tokens for that CoS priority level.

23. The non-transitory computer-readable storage medium of claim 17, wherein the method further comprises distributing overflow high-compliance or medium-compliance tokens to other CoS priority levels in a strict-priority order.

24. The non-transitory computer-readable storage medium of claim 17, wherein the method further comprises distributing overflow high-compliance or medium-compliance tokens to other CoS priority levels based at least on a relative weight assigned to a respective CoS priority level.

* * * * *